(12) United States Patent
Roberts et al.

(10) Patent No.: US 10,443,260 B2
(45) Date of Patent: Oct. 15, 2019

(54) MODULAR ANTI-BALLISTIC, BLAST AND FORCED ENTRY RESISTANT SHELTER SYSTEM

(71) Applicant: United States of America as Represented by The Secretary of The Army, Alexandria, VA (US)

(72) Inventors: Justin M Roberts, Florence, MS (US); John M Hoemann, Vicksburg, MS (US); Craig R. Ackerman, Gainesville, VA (US)

(73) Assignee: United States of America as Represented by The Secretary of The Army, Alexandria, VA (US)

( * ) Notice: Subject to any disclaimer, the term of this patent is extended or adjusted under 35 U.S.C. 154(b) by 0 days.

(21) Appl. No.: 15/461,333

(22) Filed: Mar. 16, 2017

(65) Prior Publication Data

US 2018/0010353 A1 Jan. 11, 2018

Related U.S. Application Data

(63) Continuation-in-part of application No. 15/461,226, filed on Mar. 16, 2017, which is a
(Continued)

(51) Int. Cl.
*E04H 9/10* (2006.01)
*B23P 6/00* (2006.01)
(Continued)

(52) U.S. Cl.
CPC ............ *E04H 9/10* (2013.01); *B23P 6/00* (2013.01); *E04B 1/1912* (2013.01);
(Continued)

(58) Field of Classification Search
CPC ..... E06B 1/56; E06B 1/02; B23P 6/00; E04B 1/1912; E04B 1/2403; E04B 2/58;
(Continued)

(56) References Cited

U.S. PATENT DOCUMENTS 1,995,573 A * 3/1935 Matthews ............ E04B 1/3483
52/143
4,325,309 A * 4/1982 King ...................... F42D 5/045
109/49.5
(Continued)

*Primary Examiner* — Brian E Glessner
*Assistant Examiner* — Adam G Barlow
(74) *Attorney, Agent, or Firm* — Brian C. Jones

(57) ABSTRACT

The modular anti-ballistic shelter system includes two end units and, optionally, additional middle units for a wider structure. End and middle units may also stack atop each other for multi-story structures. Each unit is configured to comply with both ISO standards for size and weight, and with the U.S. Department of State Certification Standard for Forced Entry and Ballistic Resistance of Structural Systems. Each exterior wall of each end unit and each middle unit is reinforced with wall studs that penetrate the unit's structural framework of beams and frames. Even though these wall studs are welded into place, penetration of the wall studs into the beams and frames ensures acceptable blast, ballistic, and forced entry resistance even if the welds are flawed.

19 Claims, 75 Drawing Sheets

Related U.S. Application Data continuation-in-part of application No. 13/886,248, filed on May 2, 2013.

(60) Provisional application No. 61/641,877, filed on May 2, 2012.

(51) Int. Cl.

| | | |
|---|---|---|
| *E04B 1/19* | (2006.01) | |
| *E04B 1/24* | (2006.01) | |
| *E04B 2/58* | (2006.01) | |
| *E04B 5/10* | (2006.01) | |
| *E04B 7/02* | (2006.01) | |
| *E04C 3/06* | (2006.01) | |
| *E04C 3/32* | (2006.01) | |
| *E06B 1/02* | (2006.01) | |
| *E06B 1/56* | (2006.01) | |
| *F41H 7/04* | (2006.01) | |
| *E04C 3/04* | (2006.01) | |
| *E04H 1/12* | (2006.01) | |

(52) U.S. Cl.
CPC .............. *E04B 1/2403* (2013.01); *E04B 2/58* (2013.01); *E04B 5/10* (2013.01); *E04B 7/022* (2013.01); *E04C 3/06* (2013.01); *E04C 3/32* (2013.01); *E06B 1/02* (2013.01); *E06B 1/56* (2013.01); *F41H 7/04* (2013.01); *E04B 2001/199* (2013.01); *E04B 2001/1972* (2013.01); *E04B 2001/2427* (2013.01); *E04B 2001/2448* (2013.01); *E04B 2001/2463* (2013.01); *E04B 2001/2466* (2013.01); *E04B 2001/2481* (2013.01); *E04B 2001/2484* (2013.01); *E04B 2103/06* (2013.01); *E04C 2003/0465* (2013.01); *E04C 2003/0473* (2013.01); *E04H 2001/1283* (2013.01)

(58) Field of Classification Search
CPC ...... E04B 5/10; E04B 7/022; E04B 2001/199; E04C 3/06; E04C 3/32; F41H 7/04; E04H 2001/1283
USPC ..... 52/79.9, 79.12, 106, 481.1, 169.9, 483.1
See application file for complete search history.

(56) References Cited

U.S. PATENT DOCUMENTS

| | | | |
|---|---|---|---|
| 4,389,947 A * | 6/1983 | King ................ F42D 5/045 | 109/1 S |
| 5,052,569 A * | 10/1991 | Cooper ............. B65D 90/023 | 220/1.5 |
| 5,511,908 A * | 4/1996 | Van Valkenburgh ........... B65F 1/1426 | 206/386 |
| 5,661,930 A * | 9/1997 | Porter ................ E04B 1/344 | 220/1.5 |
| 5,706,614 A * | 1/1998 | Wiley, Jr. ............ E04B 1/3483 | 52/537 |
| 5,735,639 A * | 4/1998 | Payne ............... B65D 88/121 | 206/386 |
| 6,109,469 A | 8/2000 | Clive-Smith | |
| 6,155,747 A * | 12/2000 | Payne ................ B09B 3/00 | 405/129.55 |
| 6,179,522 B1 | 1/2001 | Sanford et al. | |
| 6,299,008 B1 * | 10/2001 | Payne ............... B65D 88/121 | 220/1.5 |
| 7,565,773 B1 | 7/2009 | Romig | |
| 7,827,738 B2 * | 11/2010 | Abrams ............... E04B 1/003 | 52/79.1 |
| 8,286,391 B2 * | 10/2012 | Yang ................ E04B 1/3444 | 52/64 |
| 8,429,857 B2 * | 4/2013 | Melrose ............. F41H 5/013 | 52/169.6 |
| 8,484,929 B1 * | 7/2013 | Begdouri ........... E02D 29/045 | 52/745.03 |
| 9,316,015 B1 * | 4/2016 | Elliott ................ E04H 9/14 | |
| 2007/0044390 A1 * | 3/2007 | Meyer ................ E04H 9/10 | 52/79.1 |
| 2007/0271857 A1 * | 11/2007 | Heather .............. B65D 88/005 | 52/79.9 |
| 2010/0162929 A1 * | 7/2010 | Smit ................ E04B 1/3483 | 109/79 |
| 2011/0232543 A1 * | 9/2011 | Burroughs ........... E04H 9/06 | 109/79 |
| 2015/0322686 A1 * | 11/2015 | Harper .............. E04B 1/24 | 524/481.1 |
| 2015/0345913 A1 * | 12/2015 | Inglefield ........... F41H 5/0428 | 89/36.02 |

* cited by examiner description: Floor Girder
weight: 1386.37 lbs.
stock size: HSS 10x5x3/8"
material: ASTM A500 Grade B Dimensions are in feet and inches - Reference Standards AISC 303-05 and ISO 668:1995(E)

description: Floor/Roof Support Beam
weight: 77.34 lbs.
stock size: HSS 3x3x5/16"
material: ASTM A500 Grade B Dimensions are in feet and inches - Reference Standards AISC 303-05 and ISO 668:1995(E)

description: Roof/Floor Support Beam
weight: 58.92 lbs.
stock size: MC3x7.1
material: A36

Dimensions are in feet and inches - Reference Standards AISC 303-05 and ISO 668:1995(E)

FIG. 14
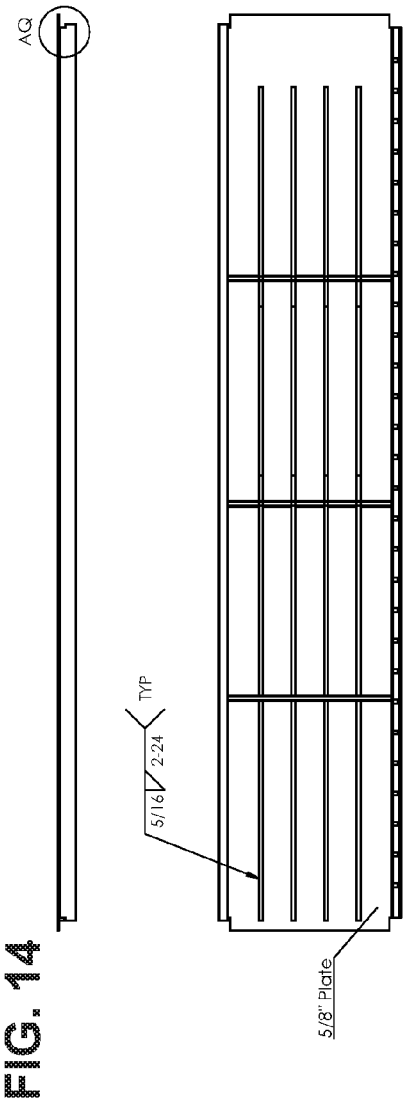
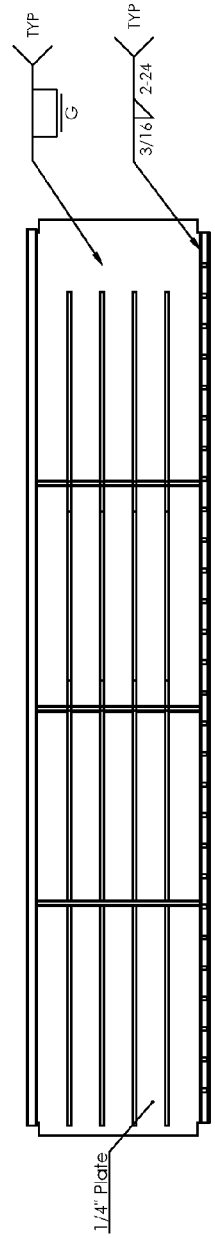
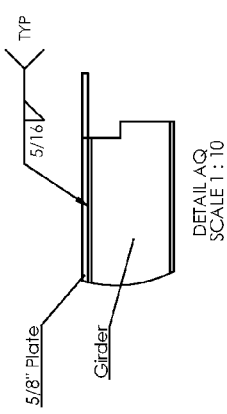

Cap the open ends description: Door header
weight: 62.86 lbs.
stock size: HSS 8x3x1/4"
material: ASTM A500 Grade B Dimensions are in feet and inches - Reference Standards AISC 303-05 and ISO 668:1995(E)

Dimensions are in feet and inches - Reference Standards AISC 303-05 and ISO 668:1995(E)

description: Wal Stud
weight: 62.56 lbs.
stock size: HSS 3x2x1/4"
material: ASTM A500 Grade B FIG. 31
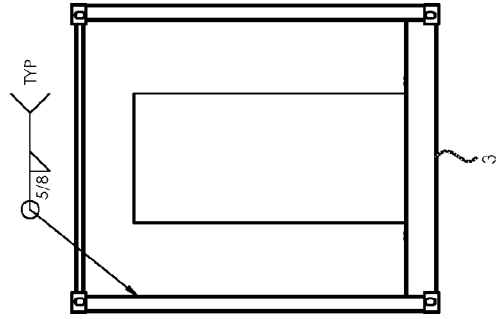
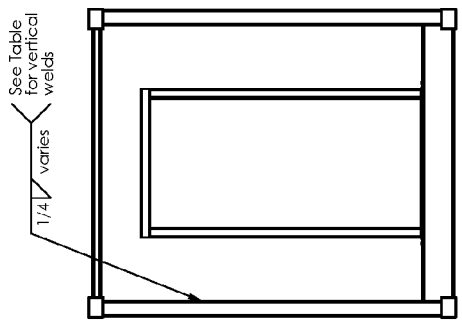
| Vertical Stich Weld & Spacing | |
|---|---|
| Weld Length | Space |
| 17 1/8" | 1 5/8" |
| 3 | 2 1/2" |
| 3 | 4 1/2" |
| 3 | 6" |
| 3 | 17 1/2" |
| 3 | 6" |
| 3 | 4 1/2" |
| 3 | 2 1/2" |
| 3 | 1 5/8" |
description: HATS40-W end wall with 1 door welds
weight: 5472.34 lbs.
stock size:
material:
Dimensions are in feet and inches - Reference Standards AISC 303-05 and ISO 668:1995(E)

Dimensions are in feet and inches - Reference Standards AISC 303-05 and ISO 668:1995(E)

description: Bottom Jack Stud
weight:
stock size: HSS 3x2x1/4"
material: ASTM A500 Grade B Dimensions are in feet and inches - Reference Standards AISC 303-05 and ISO 668:1995(E)

description: Top jack stud
weight:
stock size: HSS 3x2x1/4"
material: ASTM A500 Grade B Dimensions are in feet and inches - Reference Standards AISC 303-05 and ISO 668:1995(E)

FIG. 43
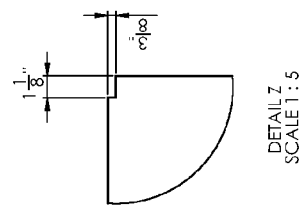
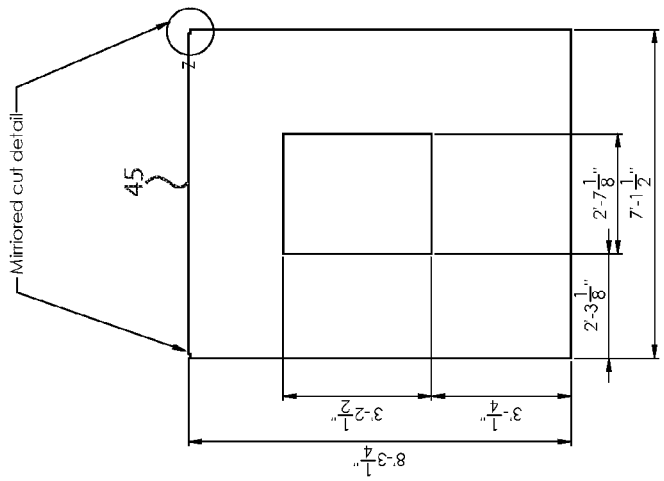

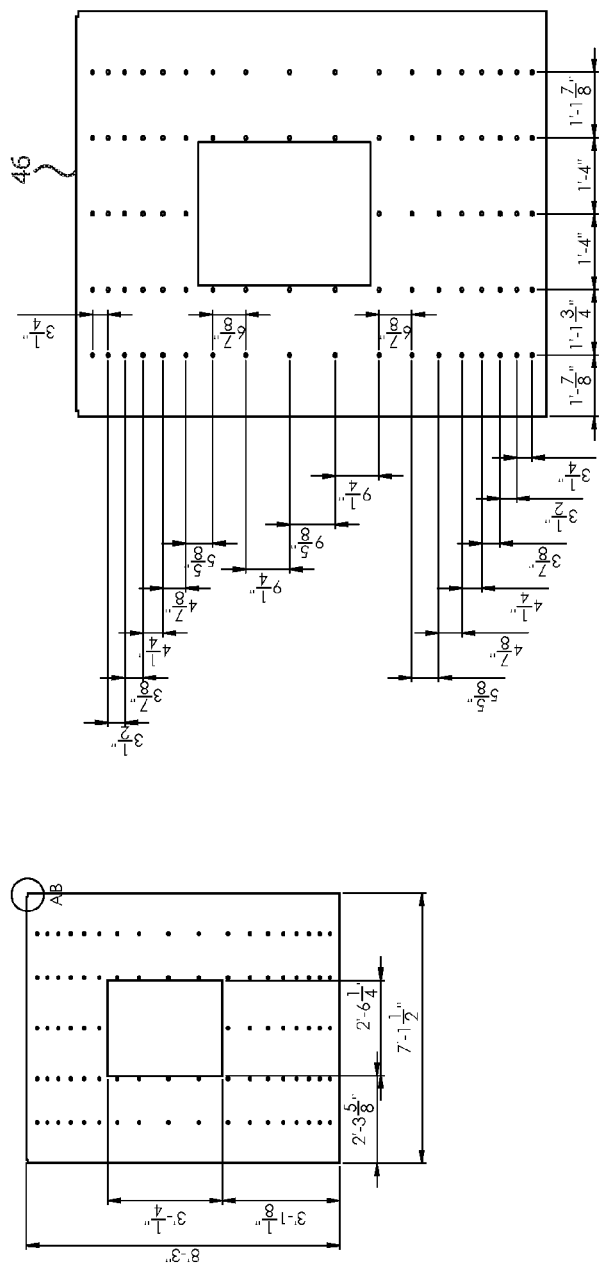
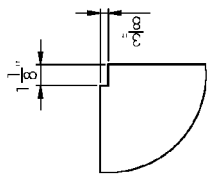
FIG. 44

FIG. 48
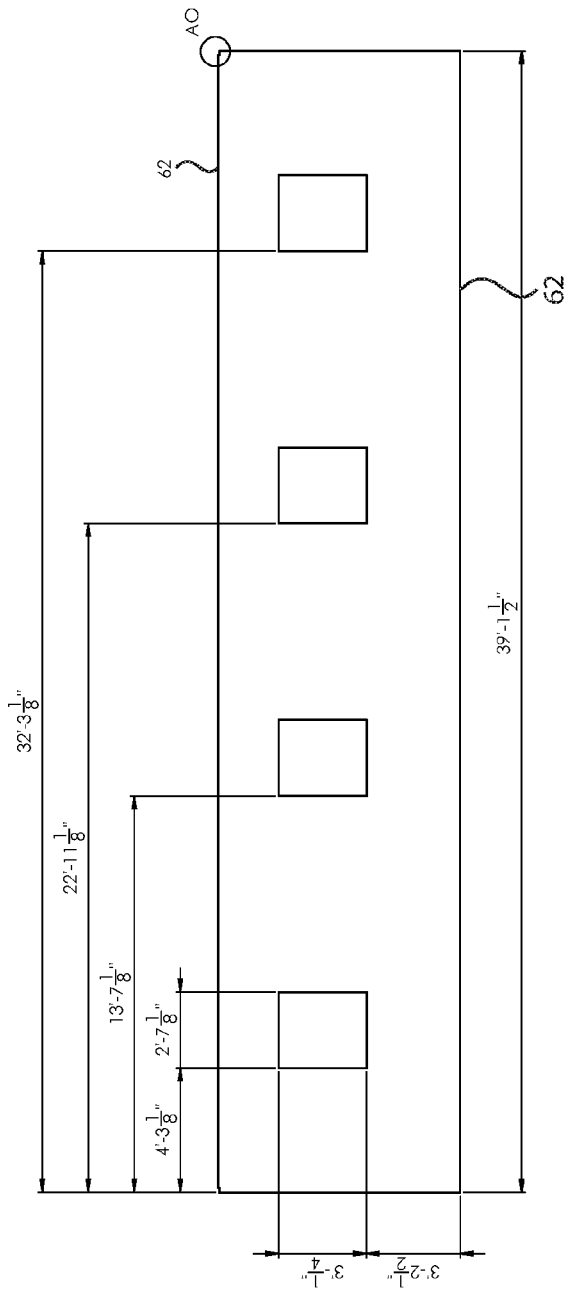
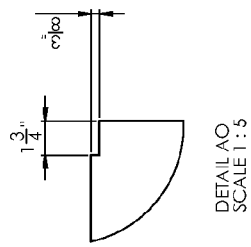
DETAIL AO
SCALE 1 : 5
description: Sidewall with window cutouts
weight: 7462.76 lbs.
stock size: PL 5/8"
material: ASTM A36
Dimensions are in feet and inches - Reference Standards AISC 303-05 and ISO 668:1995(E)

FIG. 53
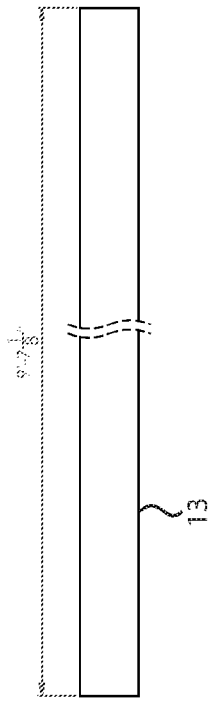
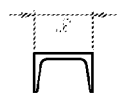
description: Floor/Roof Support Beam
weight: 58.92 lbs.
stock size: MC 3x7.1
material: ASTM A36 Steel
Dimensions are in feet and inches - Reference Standards AISC 303-05 and ISO 668:1995(E)

description: Floor/Roof Support Beam
weight: 77.34 lbs.
stock size: HSS 3x3x5/16"
material: ASTM A500 Grade B Dimensions are in feet and inches - Reference Standards AISC 303-05 and ISO 668:1995(E)

description: Top Main Girder
weight: 823.43 lbs.
stock size: HSS 9x5x1/4"
material: ASTM A500 Grade B Dimensions are in feet and inches - Reference Standards AISC 303-05 and ISO 668:1995(E)

description: Exterior Roof
weight: 8082.59 lbs.
stock size: 5/8" Plate
material: ASTM A36 Steel Dimensions are in feet and inches - Reference Standards AISC 303-05 and ISO 668:1995(E)

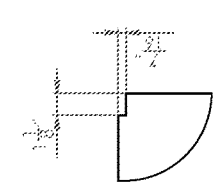
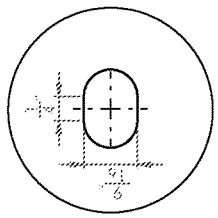
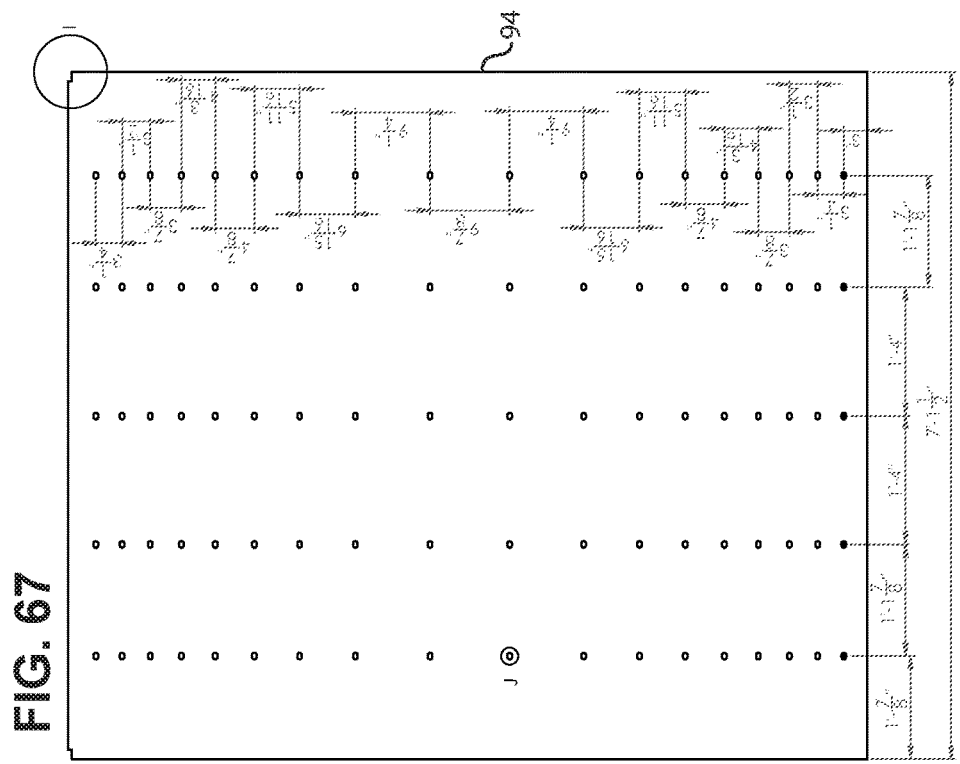
FIG. 67
The top left side of piece is a mirror of the right side
Dimensions are in feet and inches - Reference Standards AISC 303-05 and ISO 668:1995(E)
description: Interior End Plate
weight: 599.27 lbs.
stock size: 1/4" Plate
material: ASTM A36 Steel FIG. 68
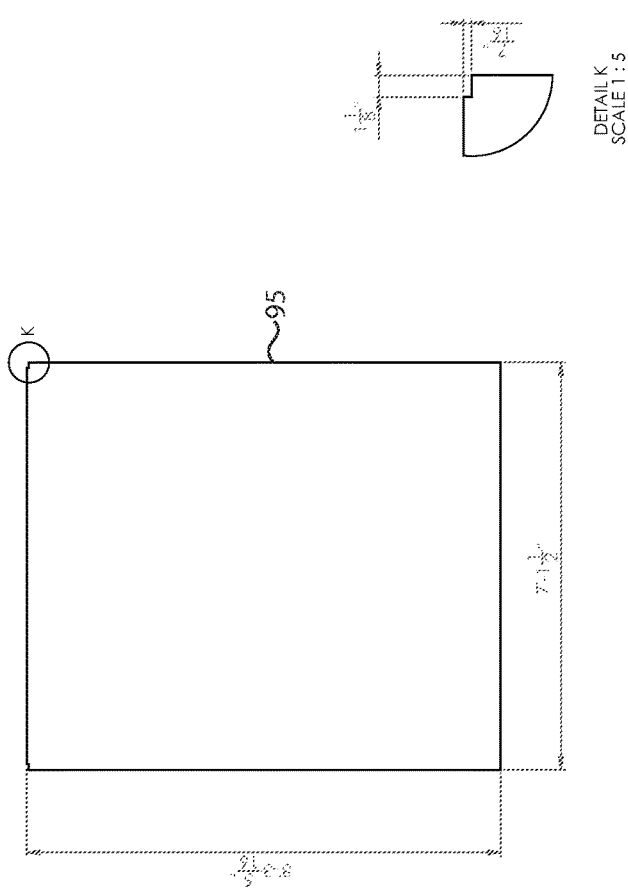
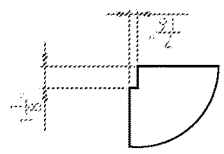
DETAIL K
SCALE 1 : 5
description: Exterior End Plate
weight: 1504.38 lbs.
stock size: 5/8" Plate
material:
The left side of piece is a mirror of the right side
Dimensions are in feet and inches - Reference Standards AISC 303-05 and ISO 668:1995(E)

Dimensions are in feet and inches - Reference Standards AISC 303-05 and ISO 668:1995(E)

Dimensions are in feet and inches - Reference Standards AISC 303-05 and ISO 668:1995(E)

MODULAR ANTI-BALLISTIC, BLAST AND FORCED ENTRY RESISTANT SHELTER SYSTEM

CROSS-REFERENCE TO RELATED APPLICATIONS

This patent application is a continuation-in-part and claims the benefit of U.S. patent application Ser. No. 15/461,226 filed Mar. 16, 2017, and U.S. patent application Ser. No. 13/886,248 filed May 2, 2013, which claims the benefit of U.S. Provisional Application No. 61/641,877 filed May 2, 2012. The above applications are incorporated by reference herein in their entirety.

STATEMENT REGARDING FEDERALLY SPONSORED RESEARCH OR DEVELOPMENT

The invention described herein was made by an employee of the United States Government and may be manufactured and used by the Government of the United States of America for governmental purposes without the payment of any royalties thereon or therefore.

FIELD OF INVENTION

This invention relates to the field of armor and more specifically to construction of armored structures which comply with both ISO and State Department Standards.

BACKGROUND OF THE INVENTION

The U.S. Army Corps of Engineers (USACE) currently uses shipping containers as components for transportable shelters to protect troops from ballistics and explosives. This system is known in the art as a Hardened Alternative Trailer System (HATS).

The HATS structures must comply with the U.S. Department of State Certification Standard for Forced Entry and Ballistic Resistance of Structural Systems, SDSTD01.01, without exceeding stringent ISO weight and dimensional specifications. USACE has conducted considerable laboratory research to develop a HATS shelter which concurrently meets most standards. U.S. patent application Ser. No. 13/886,248 (the '248 application) teaches precise specifications developed by the government to meet ISO Standard No. 668:2013 for twenty-foot structures.

At present, over four hundred structures having the specifications taught in the '248 application have been fielded "in theater." At a cost of several hundred thousand USD per structure, this technology represents investment in the range of $100,000,000 to the U.S. government. However, these structures are limited to no more than twenty feet in length, and no more than 8 feet wide or 8.6 feet high, which can restrict the utility of the structures.

To address this problem, USACE conducted extensive research and testing to develop precise specifications for forty foot structures. These extensive specifications are taught in co-pending U.S. patent application Ser. No. 15/461,226 filed Mar. 16, 2017.

However, there is a continuing unmet need for considerably larger structures with much greater width and height than are permitted under current ISO standards.

BRIEF SUMMARY OF THE INVENTION

A modular anti-ballistic shelter system incorporates multiples end units. Each end unit includes a base assembly, a top assembly, first and second end wall assemblies, and a sidewall assembly.

The base assembly includes channeled floor/roof support beams extending between floor girders and connected to floor/roof support beams. A floor connects to the floor girders. One of the floor girders has stud apertures spaced 16 inches apart at center.

Each of the channeled floor/roof support beams has a length of 9.59375 feet, a width of 3 inches, a height of 2 inches, and a weight of 7.1 lbs. per foot of length. Each of the floor girders has a length of 39.125 feet and a hollow structural cross-section of 10 by 5 by 3/8 inches. Each of the floor/roof support beams has a length of 7.125 feet and a hollow structural cross-section of 3 by 3 by 5/16 inches. The floor has dimensions of 39.5 feet by 7.395833 feet.

The top assembly includes channeled floor/roof support beams extending between a top girder and a top main girder and connected to floor/roof support beams. A roof connects to and is located above the top girder and the top main girder, while an interior roof connects to and is located below the top girder and the top main girder. The top girder has stud apertures spaced 16 inches apart at center.

The top girder has a length of 39.833 feet and a hollow structural cross-section of 5 by 3 by ½ inches. The top main girder has a length of 39.125 feet and a hollow structural cross-section of 9 by 5 by ¼ inches. The roof has dimensions of 39.95833 feet by 7.95833 feet. The interior roof has dimensions of 39.20833 feet by 7.125 feet.

The first end wall assembly includes two ISO right freight container corner fittings and two ISO left freight container corner fittings, with a bottom frame and a top frame connecting the two ISO right freight container corner fittings to the two ISO left freight container corner fittings. Corner columns connect the two ISO right freight container corner fittings and the two ISO left freight container corner fittings. Exterior and interior plates connect to the bottom frame, the top frame, and the corner columns. The bottom frame and the top frame have stud apertures, with wall studs extending through the stud apertures into the bottom frame and the top frame.

The bottom frame has a length of 6.9270833 feet and a hollow structural cross-section of 10 by 5 by 3/8 inches. The top frame has a length of 6.9270833 feet and a hollow structural cross-section of 5 by 3 by 3/8 inches. Each of the corner columns has a height of 9.166 feet and a hollow structural cross-section of 5 by 5 by 3/8 inches. Each of the wall studs has a height of 9.166 feet and a hollow structural cross-section of 3 by 2 by ¼ inches. The exterior plate has dimensions of 7.125 feet by 8.270833 feet. The interior plate has dimensions of 7.125 feet by 8.270833 feet.

The second end wall assembly includes two ISO right freight container corner fittings and two ISO left freight container corner fittings, with a bottom frame end and a top frame end connecting the two ISO right freight container corner fittings to the two ISO left freight container corner fittings. Corner columns connect the two ISO right freight container corner fittings and the two ISO left freight container corner fittings. Exterior and interior end walls connect to the bottom frame end, the top frame end, and the corner columns. The bottom frame end and the top frame end have stud apertures, with wall studs extending through the stud apertures into the bottom frame end and the top frame end.

The bottom frame end has a length of 7.125 feet and a hollow structural cross-section of 10 by 5 by 3/8 inches. The top frame end has a length of 6.9270833 feet and a hollow structural cross-section of 5 by 3 by ½ inches. The exterior end wall has dimensions of 7.125 feet by 8.270833 feet. The interior end wall has dimensions of 7.125 feet by 8.25 feet.

The sidewall assembly includes exterior and interior sidewalls connected to one of the floor girders and the top girder, with wall studs extending into the top girder and one of the floor girders through the stud apertures in the top girder and one of the floor girders. The exterior sidewall has dimensions of 39.125 feet by 8.25 feet, while the interior sidewall has dimensions of 39.125 feet by 8.25 feet.

BRIEF DESCRIPTION OF SEVERAL VIEWS OF THE DRAWING(S)

FIGS. 1-49 illustrate the components of an exemplary embodiment of an end unit for a modular anti-ballistic shelter system.

FIG. 1 illustrates the end unit including a base assembly, a top assembly, an endwall assembly with door, an endwall assembly with window, and a sidewall assembly with windows.

FIG. 2 illustrates the base assembly including floor girders, floor/roof support beams, channeled floor/roof support beams, and floor.

FIGS. 3 and 4 illustrate floor girders.

FIG. 5 illustrates the floor/roof support beam.

FIG. 6 illustrates the channeled floor/roof support beam.

FIG. 7 illustrates the floor.

FIG. 8 illustrates base assembly welds.

FIG. 9 illustrates the top assembly including floor/roof support beams, channeled floor/roof support beams, top girder, top main girder, roof, and interior roof.

FIG. 10 illustrates the top girder.

FIG. 11 illustrates the top main girder.

FIG. 12 illustrates the roof.

FIG. 13 illustrates the interior roof.

FIG. 14 illustrates the top assembly welds.

Figure 15:
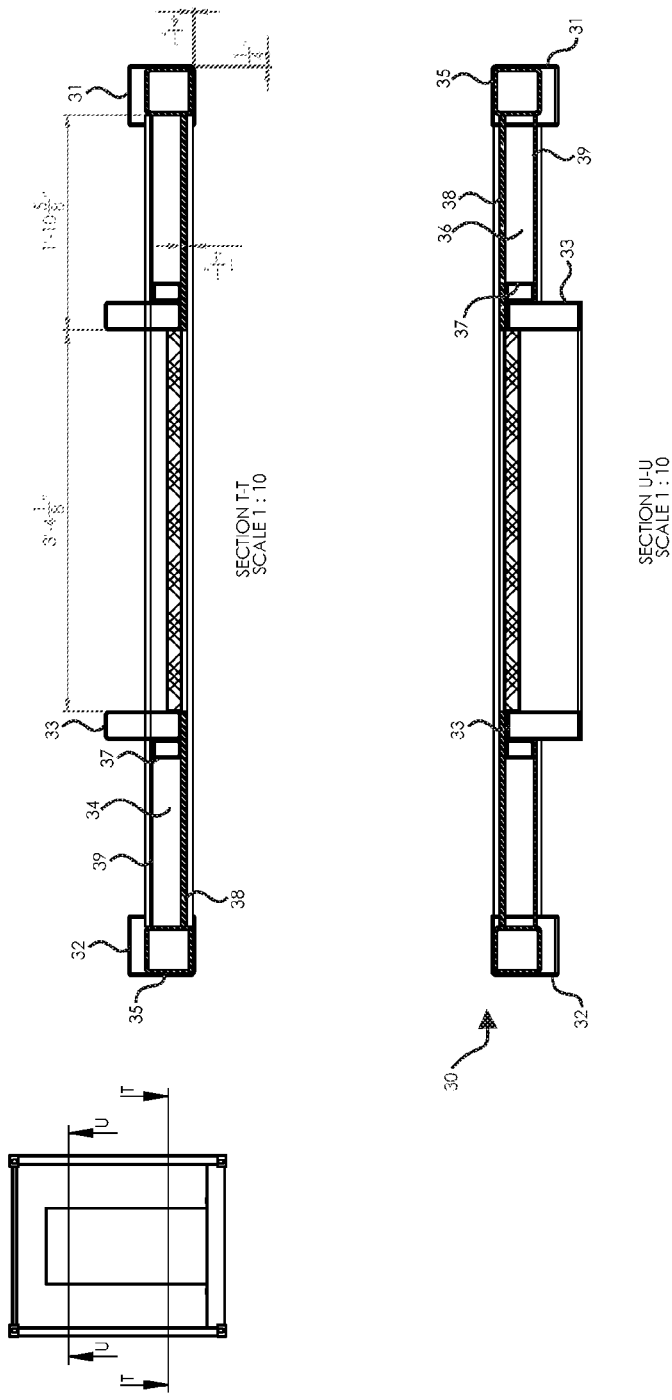
Figure 16:
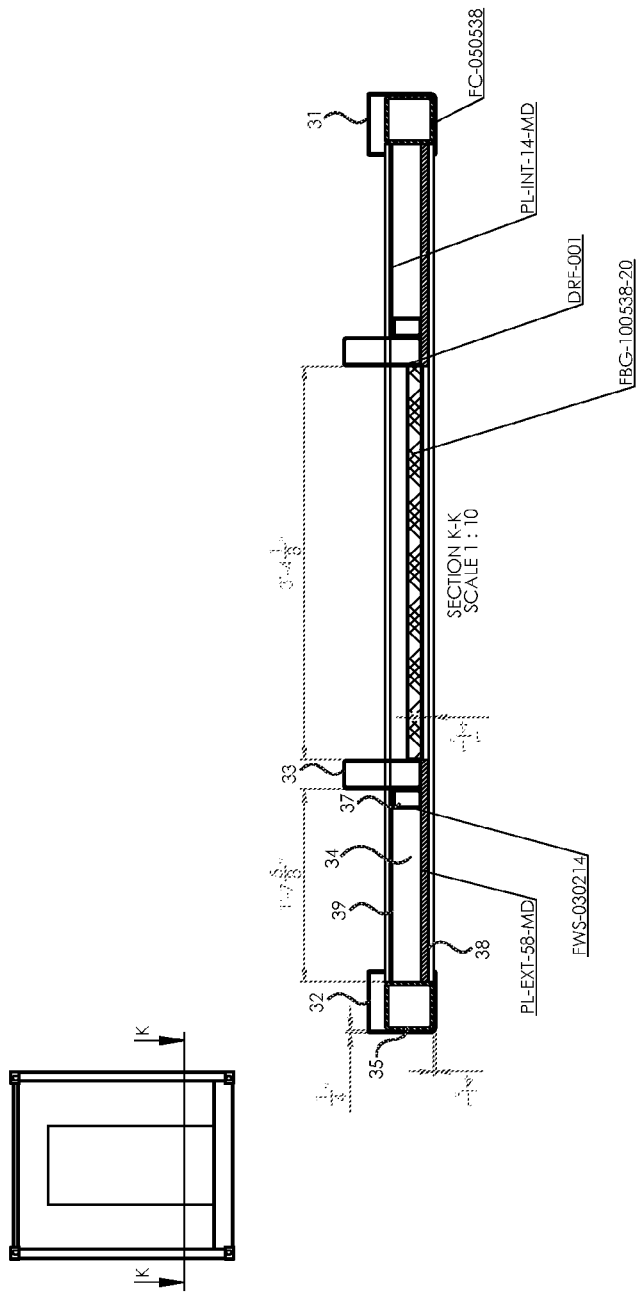
Figure 17:
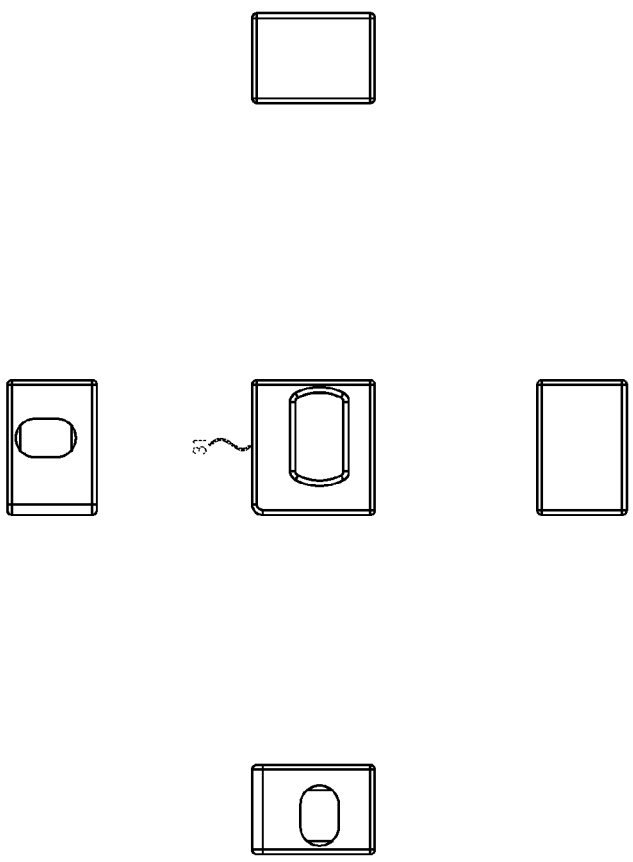
Figure 18:
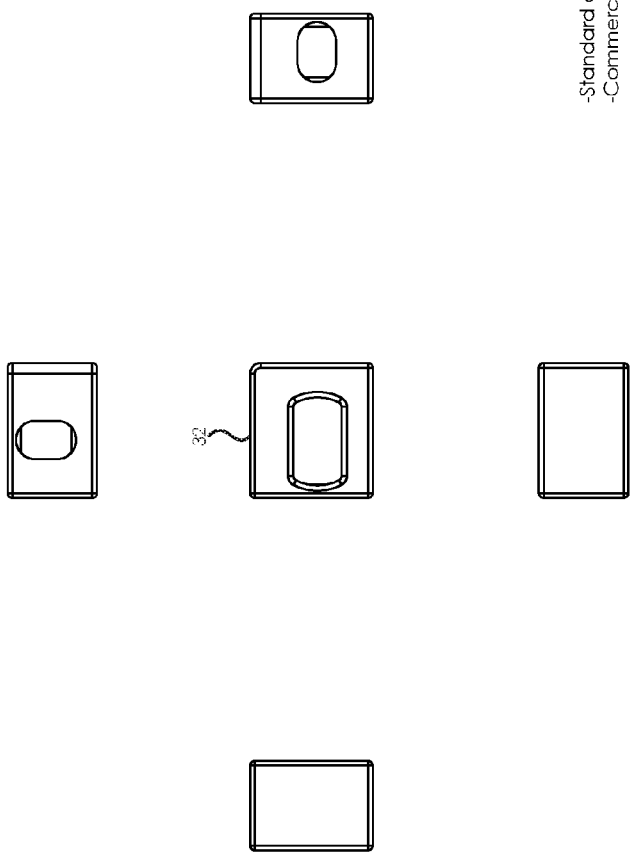

FIG. 15 illustrates the end wall assembly with door, including ISO right freight container corner fitting, ISO left freight container corner fitting, door frame assembly, bottom frame for middle door, corner column, top frame for middle door, wall stud, exterior plate for middle door, and interior plate for middle door. FIG. 16 illustrates a cross section of end wall assembly with door. FIG. 17 illustrates the ISO right freight container corner fitting. FIG. 18 illustrates the ISO left freight container corner fitting.

Figure 19:
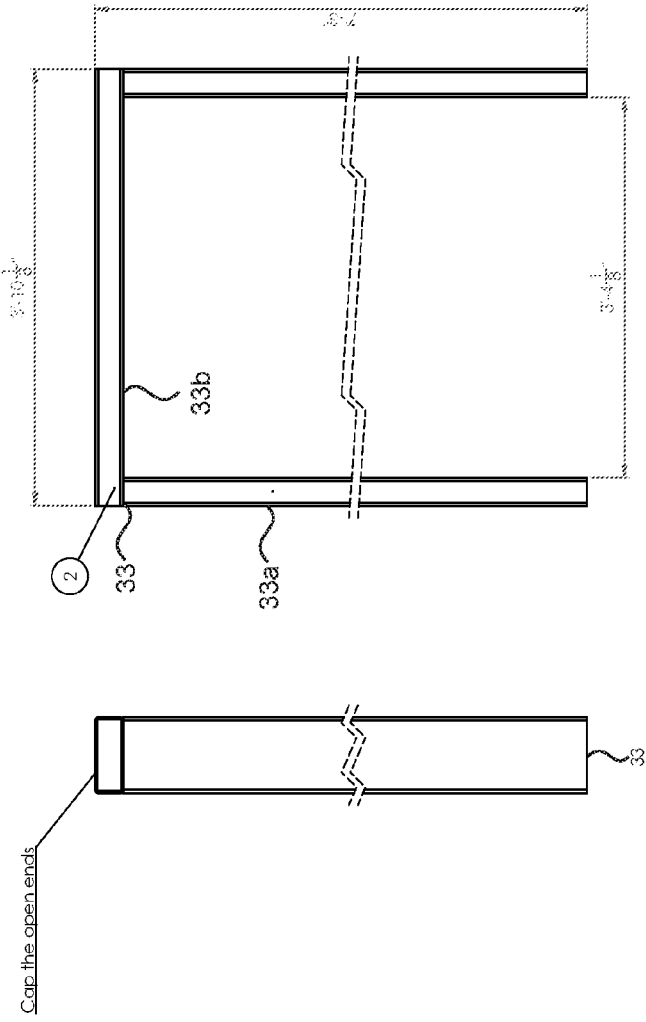
Figure 20:
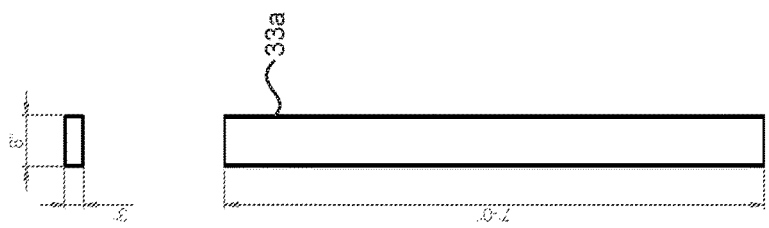

FIGS. 19-20 illustrate door frame assembly, vertical door frame, and door header.

Figure 22:
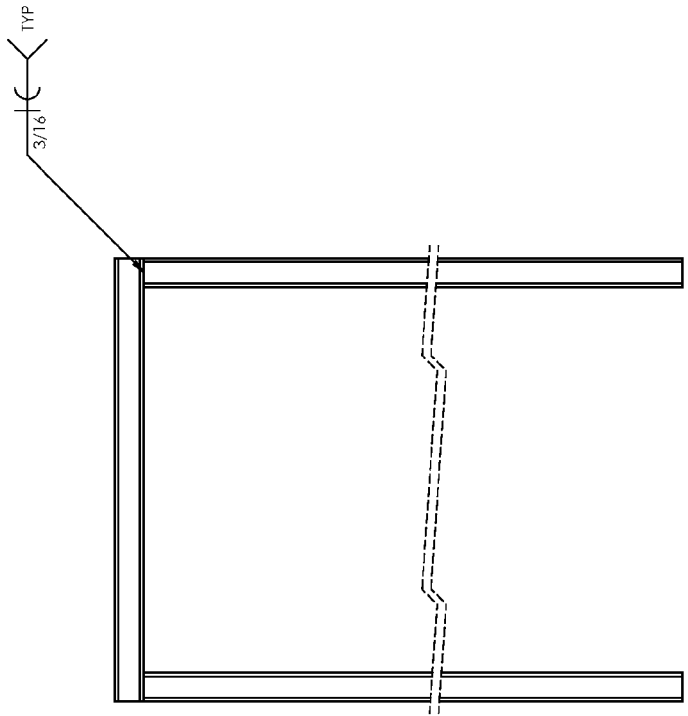
Figure 23:
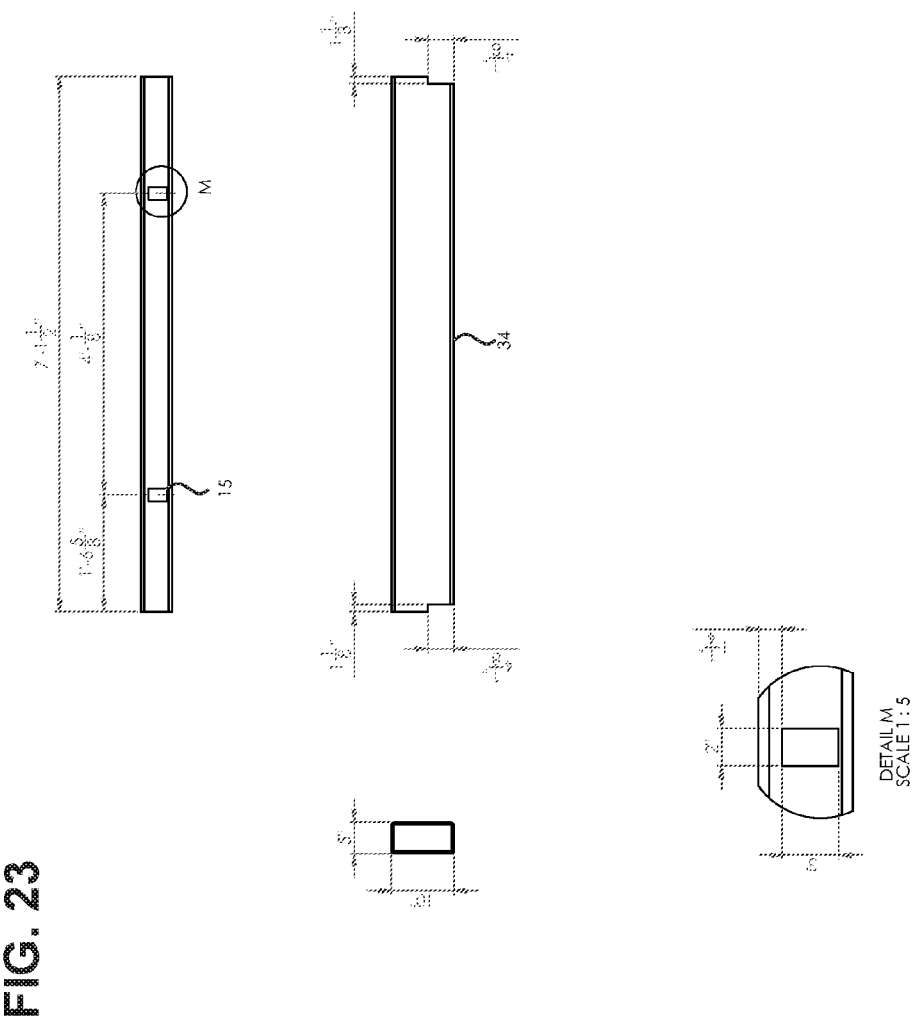
Figure 24:
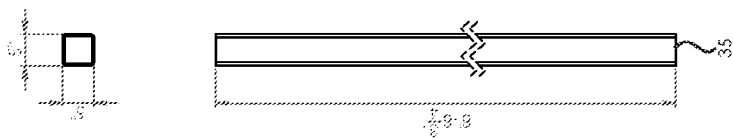
Figure 25:
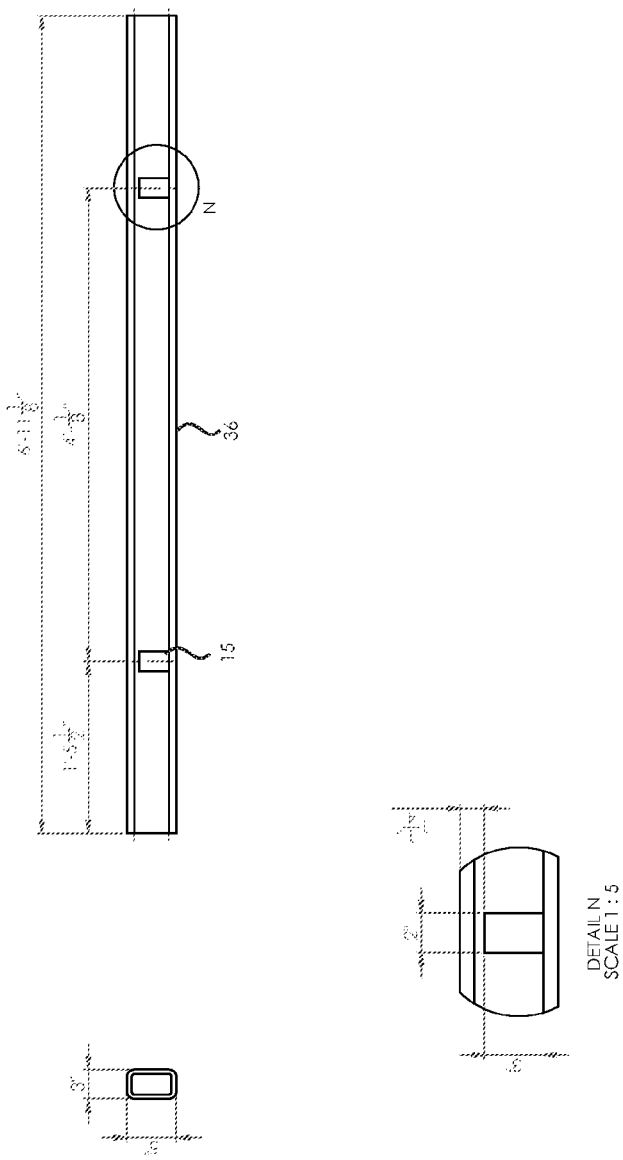
Figure 26:
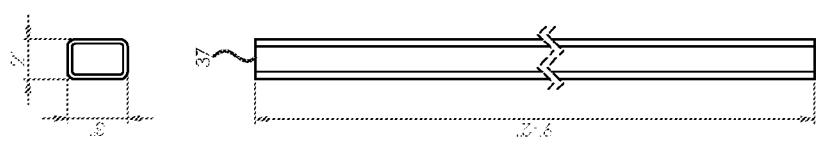
Figure 27:
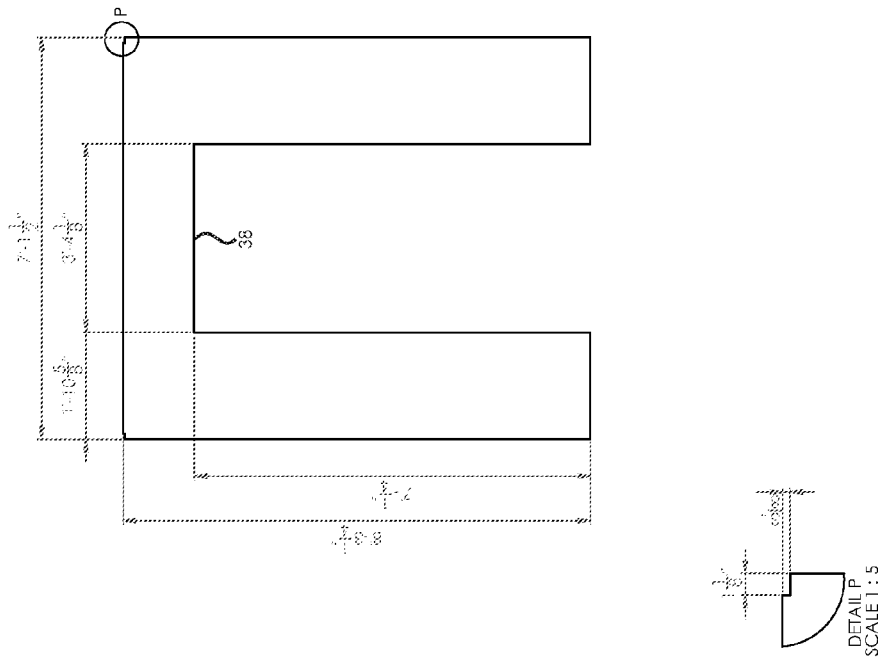
Figure 28:
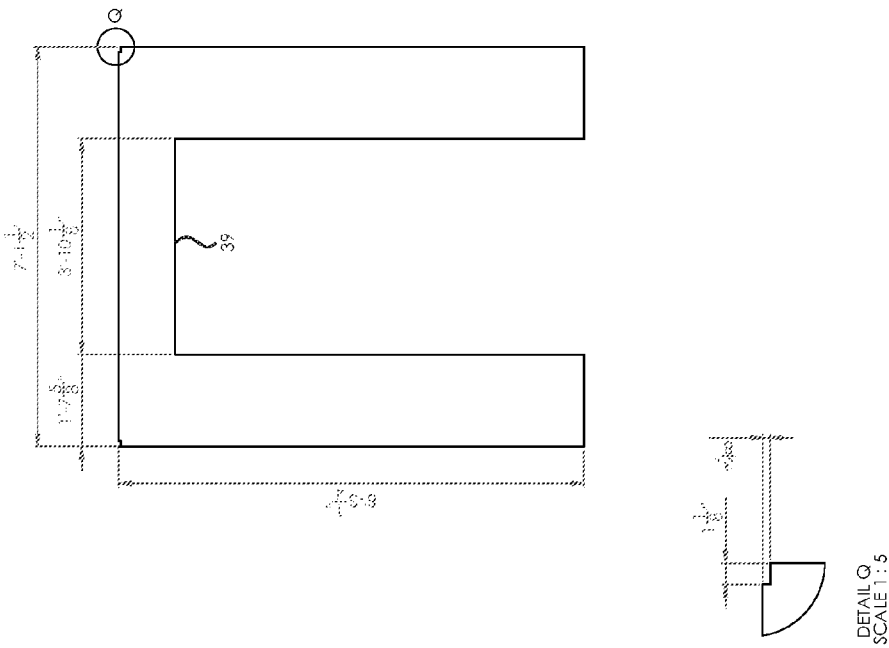
Figure 29:
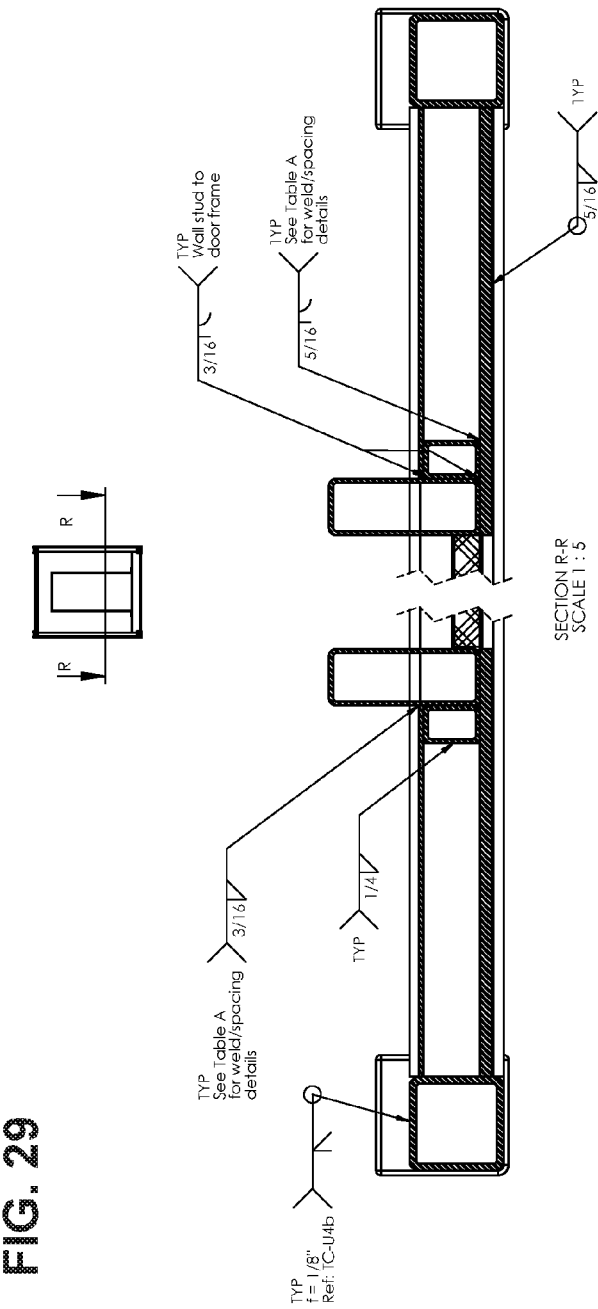
Figure 30:
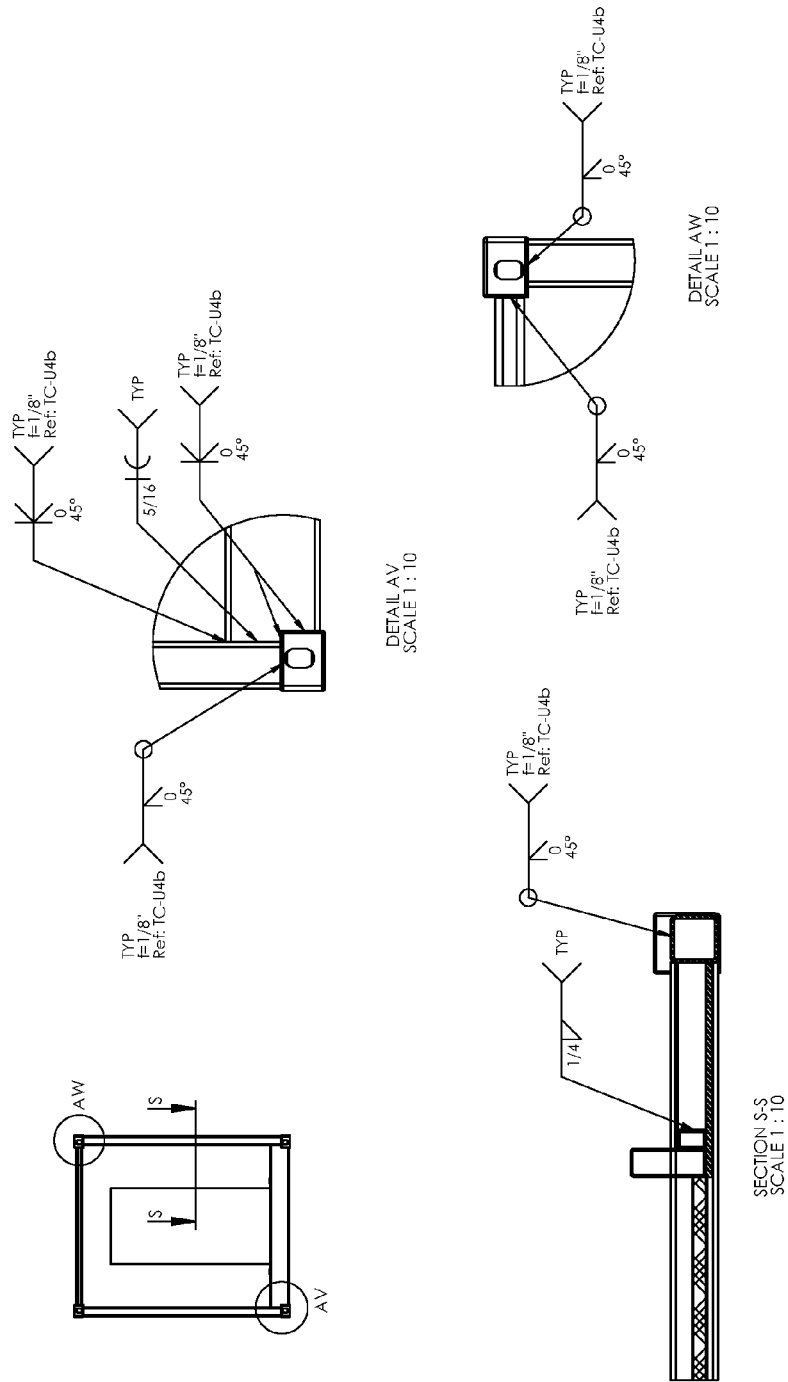

FIG. 22 illustrates the door frame assembly welds. FIG. 23 illustrates the bottom frame for middle door. FIG. 24 illustrates the corner column. FIG. 25 illustrates the top frame for middle door. FIG. 26 illustrates the wall stud. FIG. 27 illustrates the exterior plate for middle door. FIG. 28 illustrates the interior plate for middle door. FIG. 29-31 illustrate the end wall with door welds.

Figure 32:
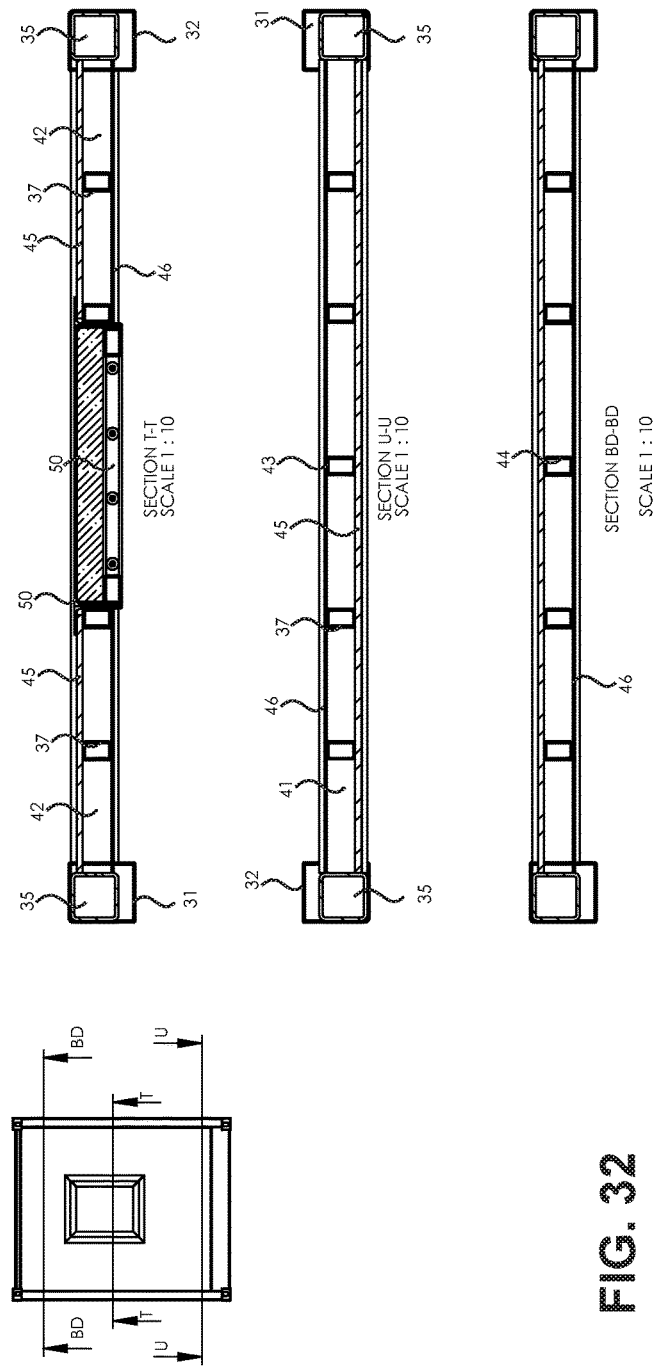

FIG. 32 illustrates the end wall assembly with window, including bottom frame end, top frame end, wall studs, bottom jack studs, top jack studs, exterior end wall, interior end wall, and window frame assembly.

Figure 33:
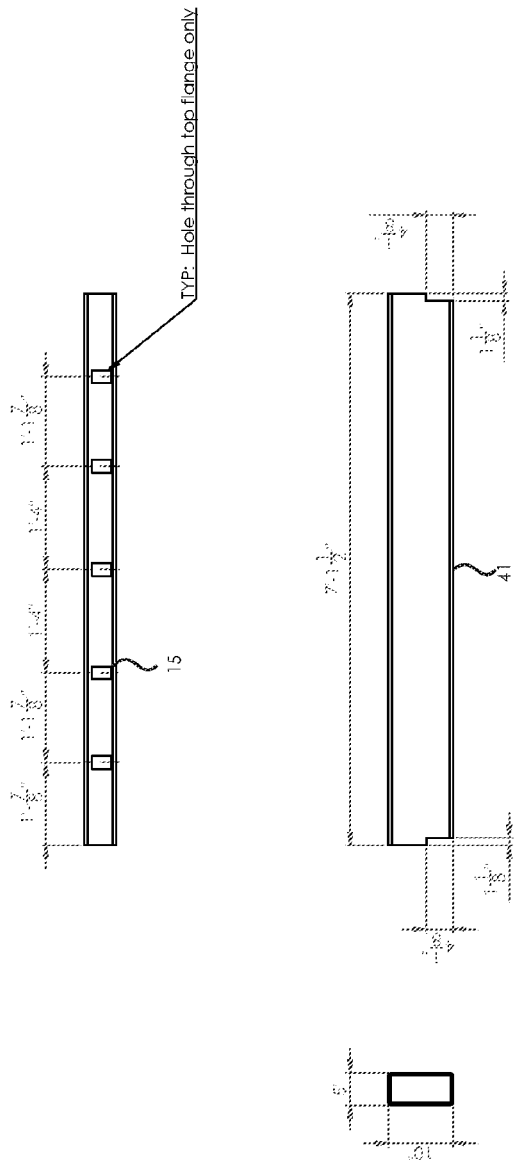

FIG. 33 illustrates the bottom frame end.

Figure 34:
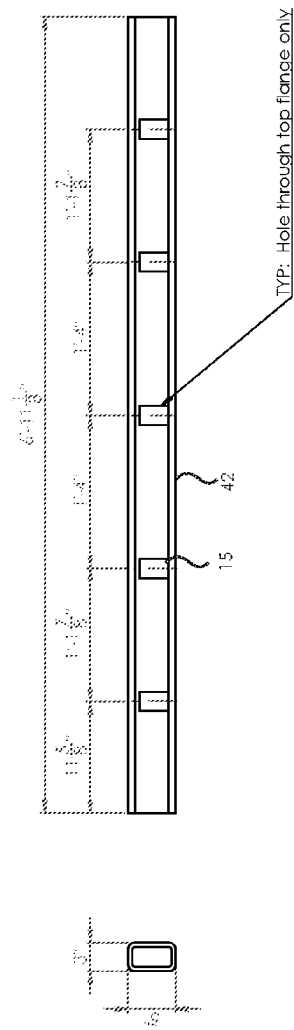

FIG. 34 illustrates the top frame end.

Figure 35:
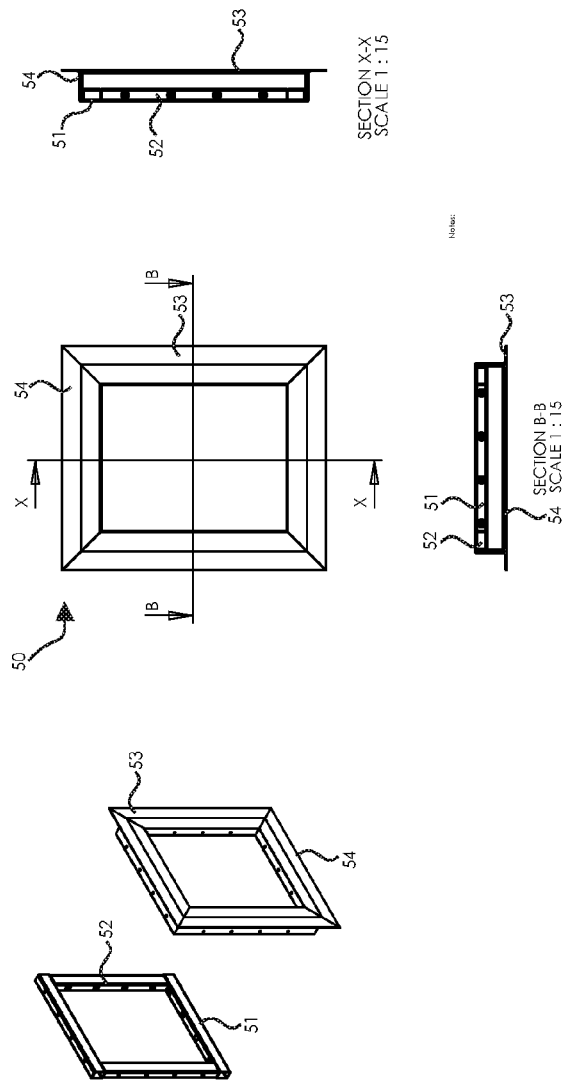

FIG. 35 illustrates the window frame assembly.

Figure 36:
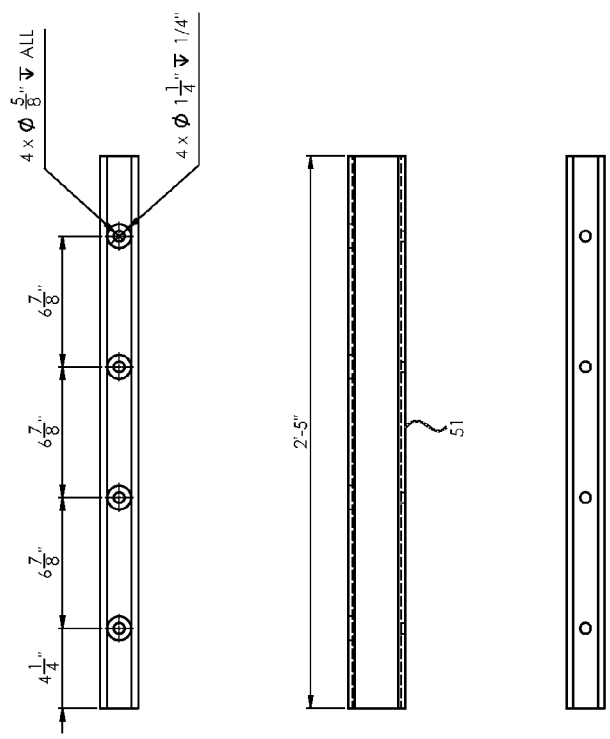

FIG. 36 illustrates the horizontal window frame.

Figure 37:
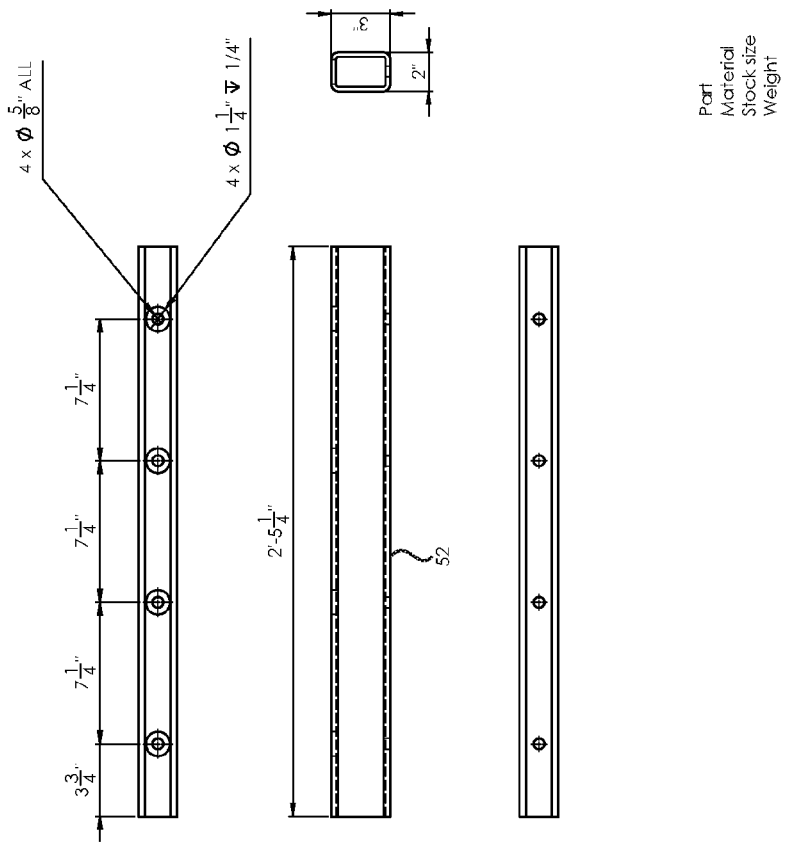

FIG. 37 illustrates the vertical window frame.

Figure 38:
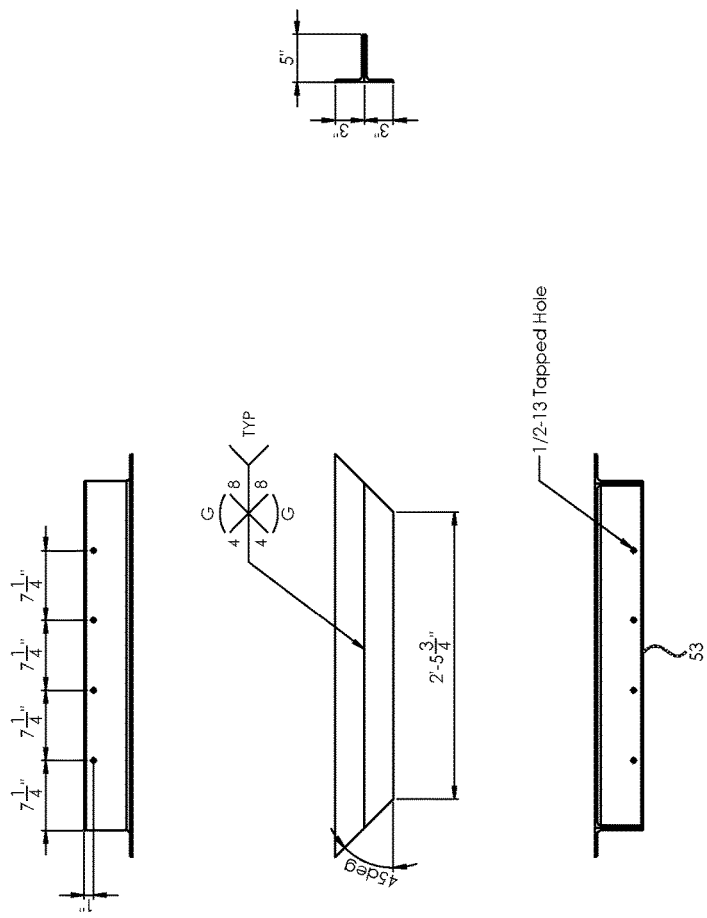

FIG. 38 illustrates the vertical window molding.

Figure 39:
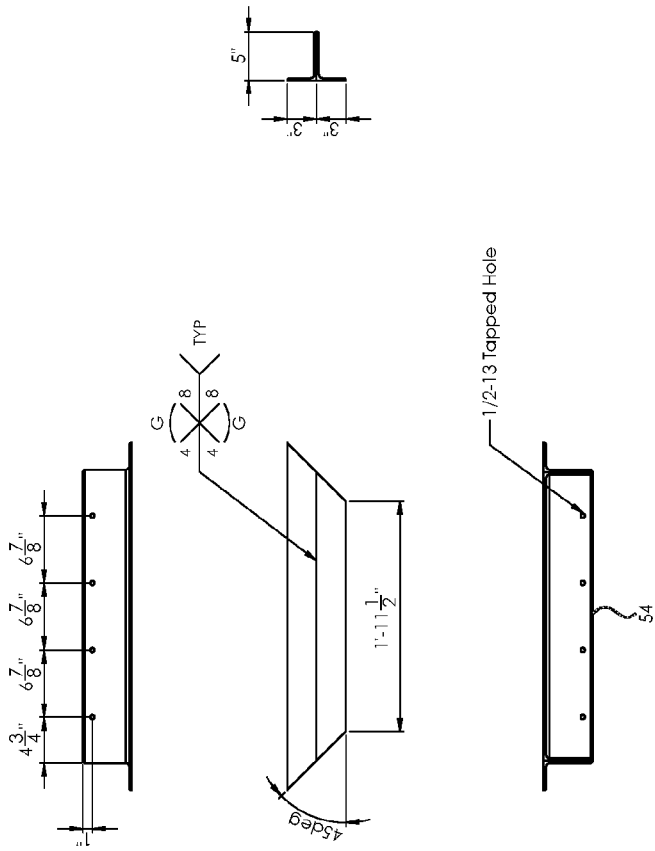

FIG. 39 illustrates the horizontal window molding.

Figure 40:
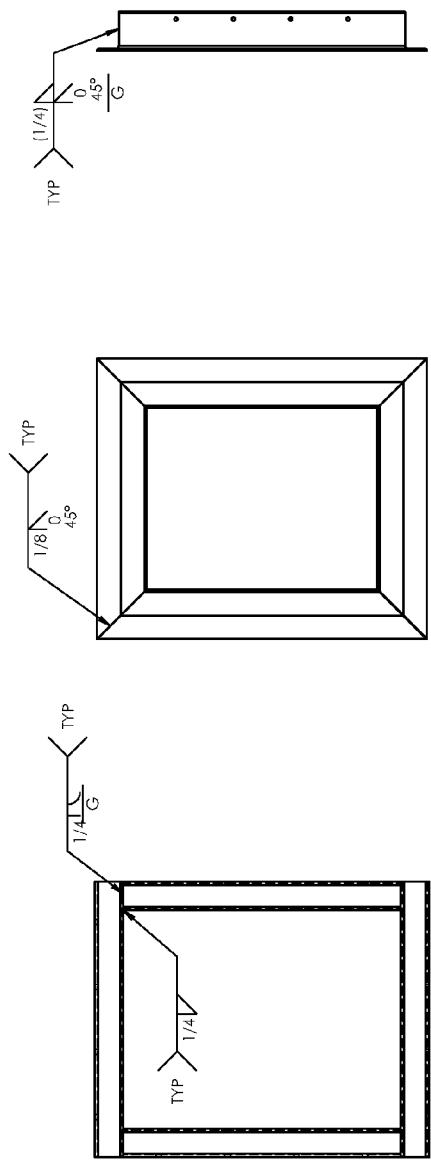

FIG. 40 illustrates the window frame assembly welds.

Figure 41:
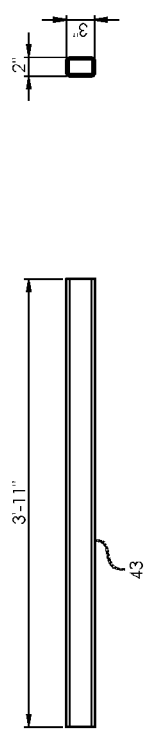

FIG. 41 illustrates the bottom jack stud.

Figure 42:
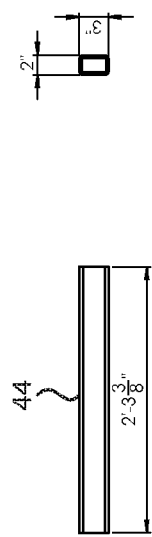

FIG. 42 illustrates the top jack stud.

FIG. 43 illustrates the exterior end wall.

FIG. 44 illustrates the interior end wall.

Figure 45:
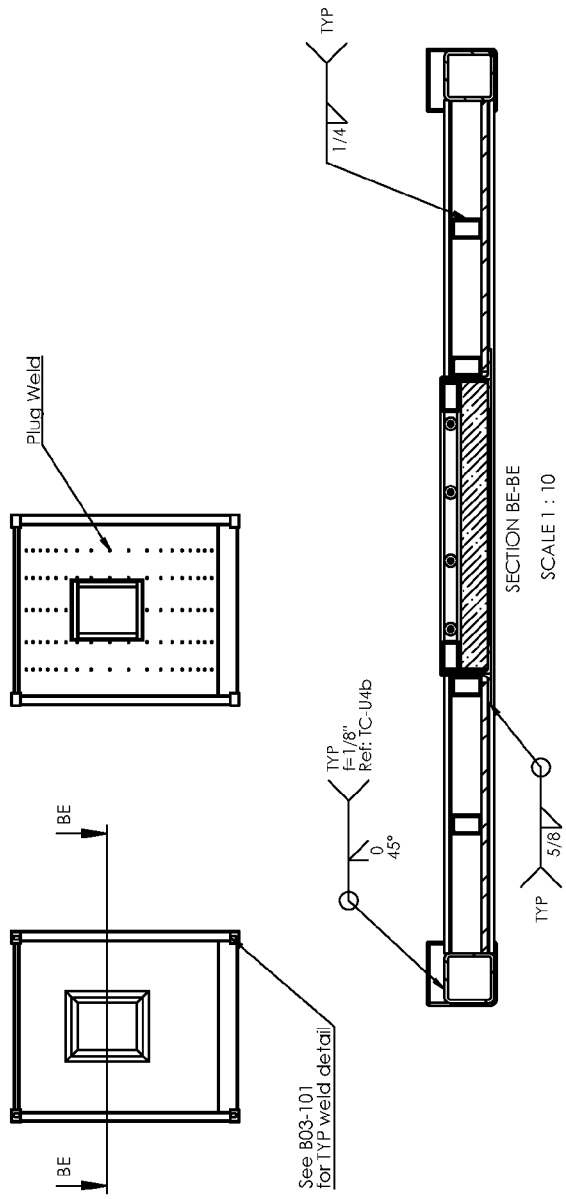

FIG. 45 illustrates a cross section of the end wall assembly with window.

Figure 46:
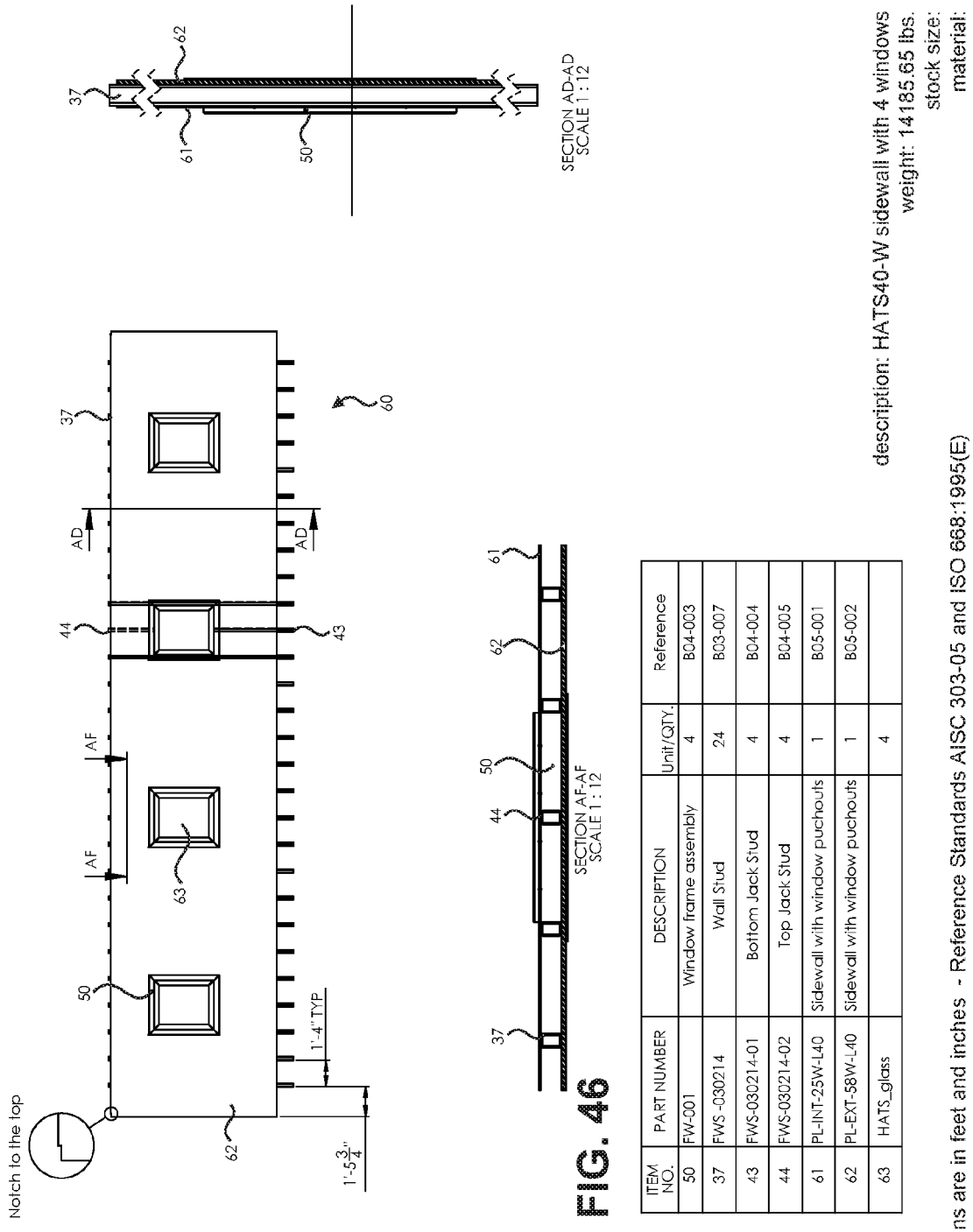

FIG. 46 illustrates the sidewall assembly with windows, window frame assemblies, wall studs, bottom jack studs, top jack studs, interior sidewall, and exterior sidewall.

Figure 47:
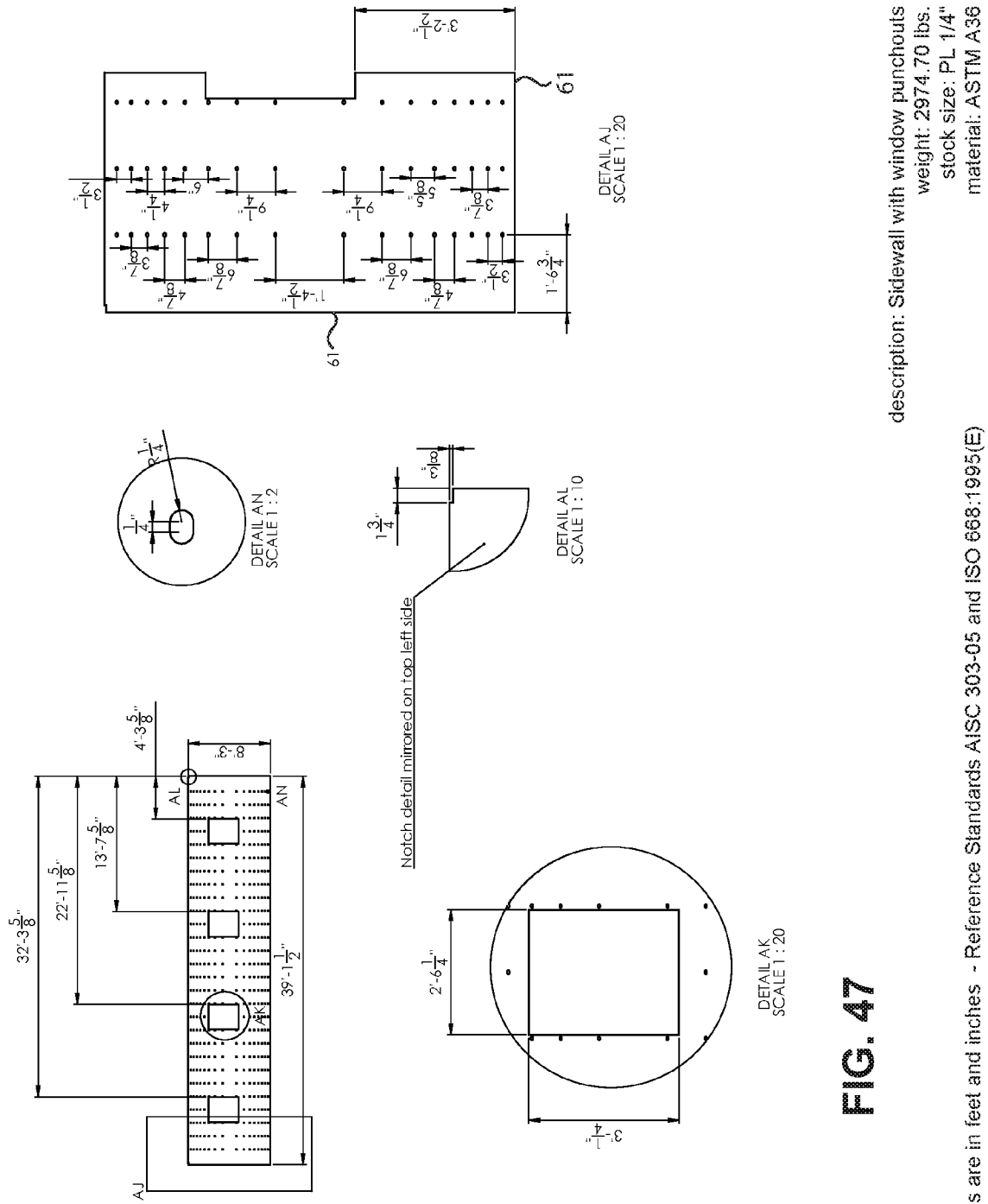

FIG. 47 illustrates the interior sidewall with punchouts.

FIG. 48 illustrates the exterior sidewall with cutouts.

Figure 49:
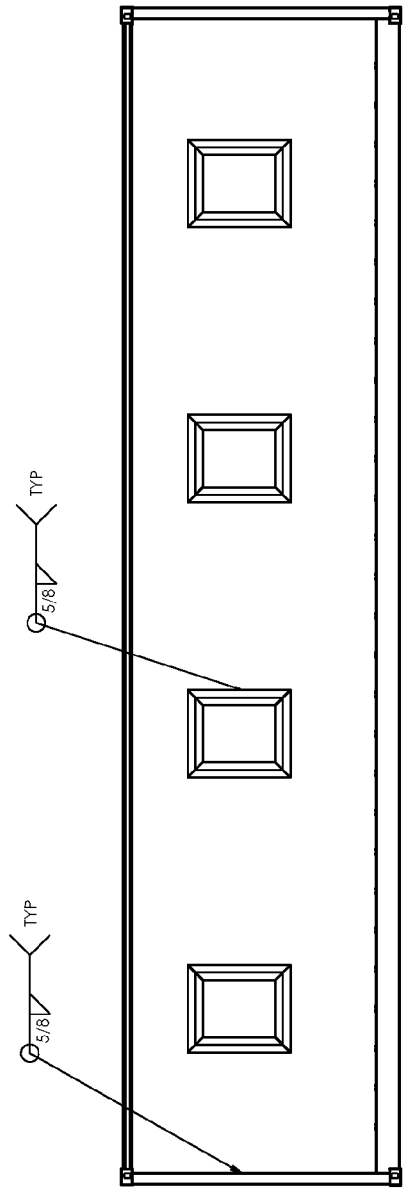

FIG. 49 illustrates the sidewall assembly with windows welds.

FIGS. 50-69 illustrate the components of an exemplary embodiment of an optional middle unit for the modular anti-ballistic shelter system.

Figure 50:
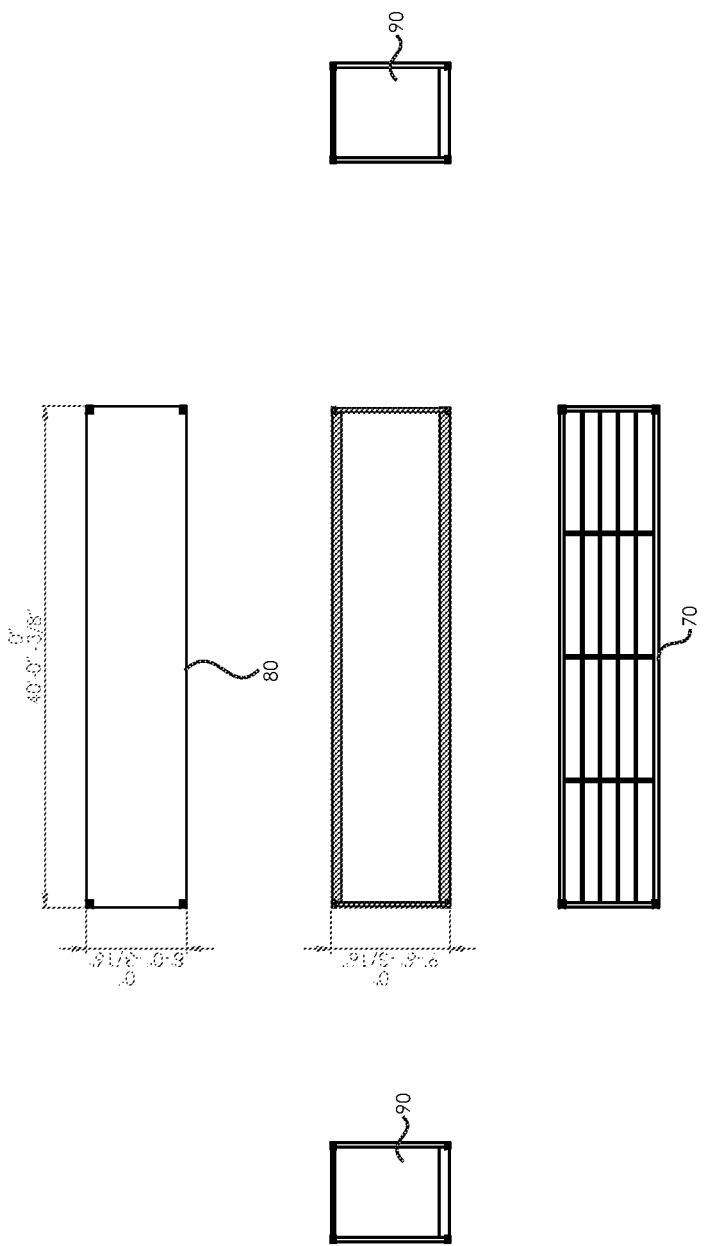

FIG. 50 illustrates an optional middle unit including a middle base assembly, a middle top assembly, and end walls without openings.

Figure 51:
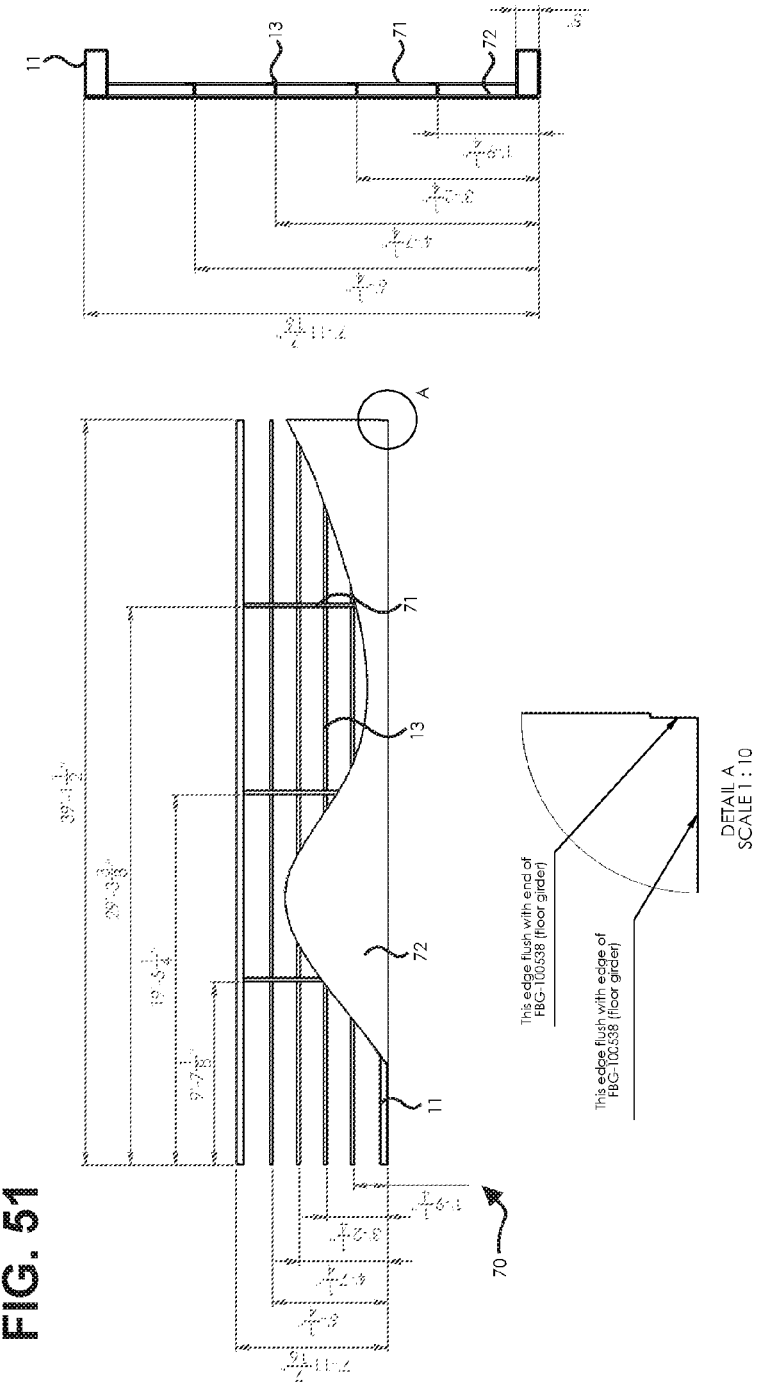
Figure 52:
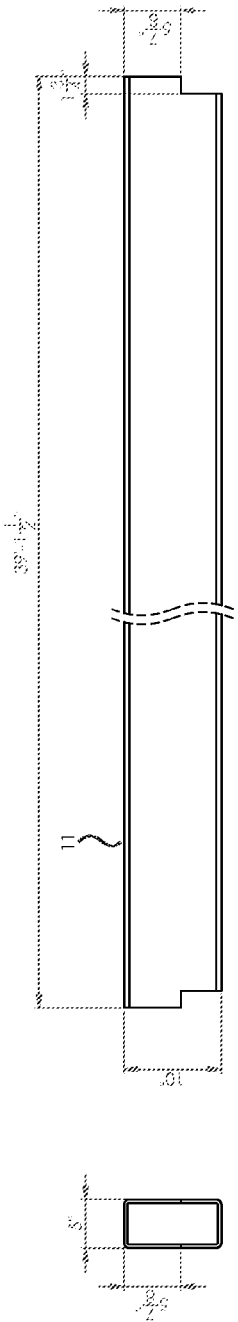

FIG. 51 illustrates the middle base assembly including floor girders, channeled floor/roof support beams, middle floor/roof support beams, and middle floor. FIG. 52 illustrates the floor girder.

FIG. 53 illustrates the channeled floor/roof support beam.

Figure 54:
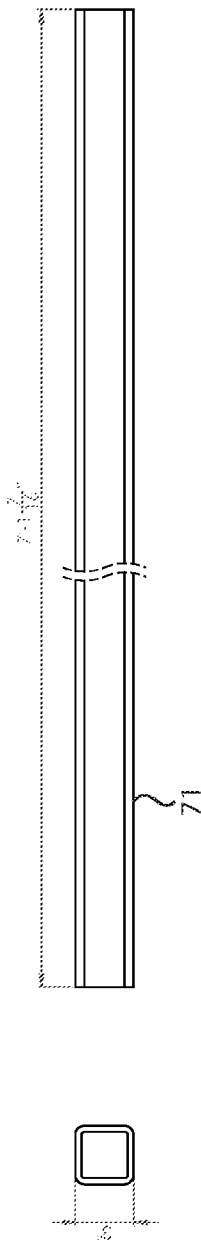

FIG. 54 illustrates the middle floor/roof support beam.

Figure 55:
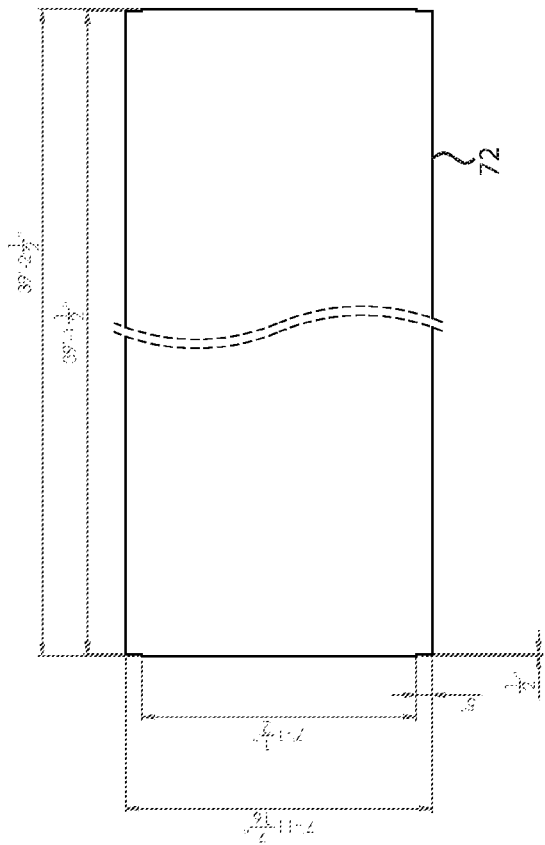

FIG. 55 illustrates the middle floor.

Figure 56:
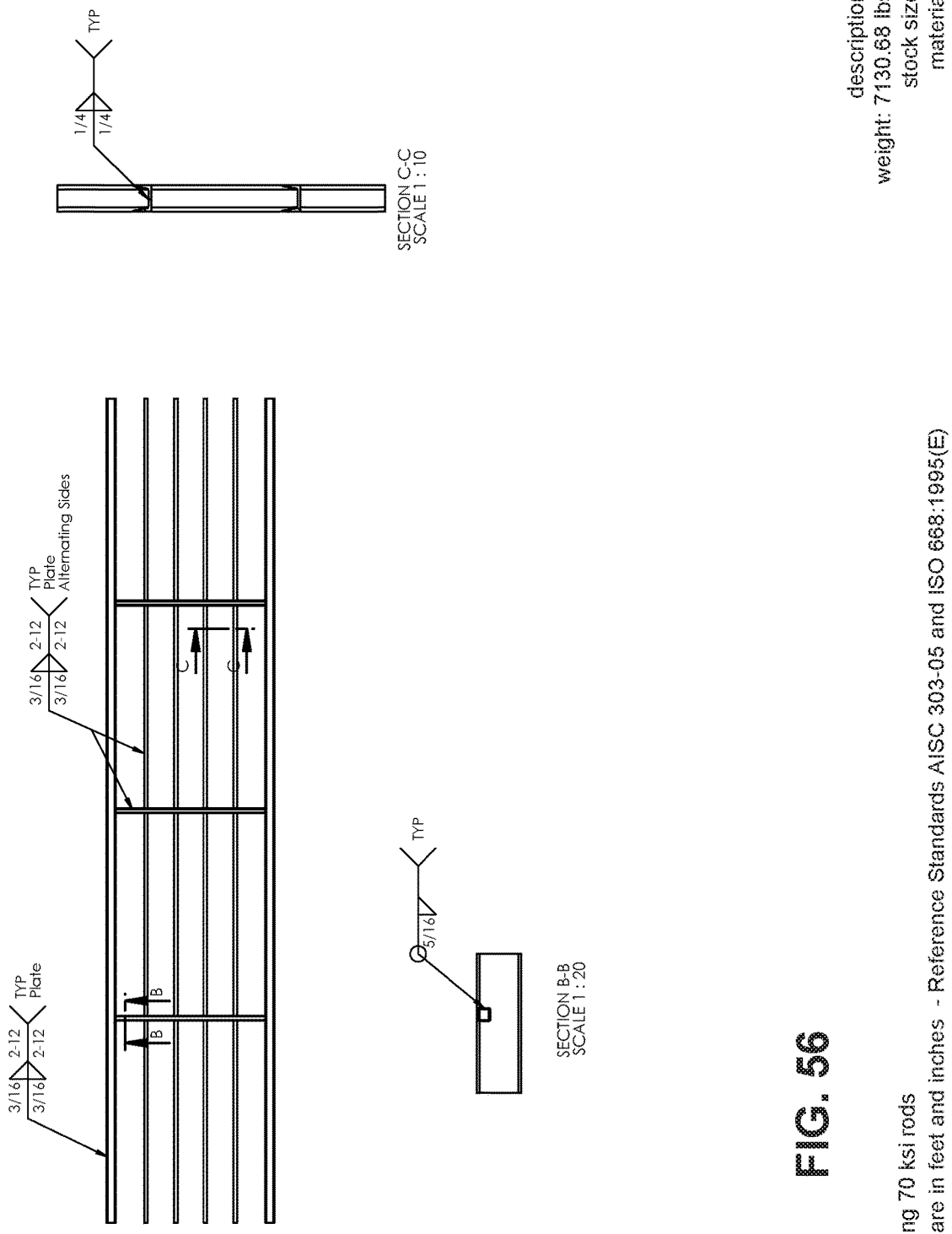

FIG. 56 illustrates the middle base assembly welds.

Figure 57:
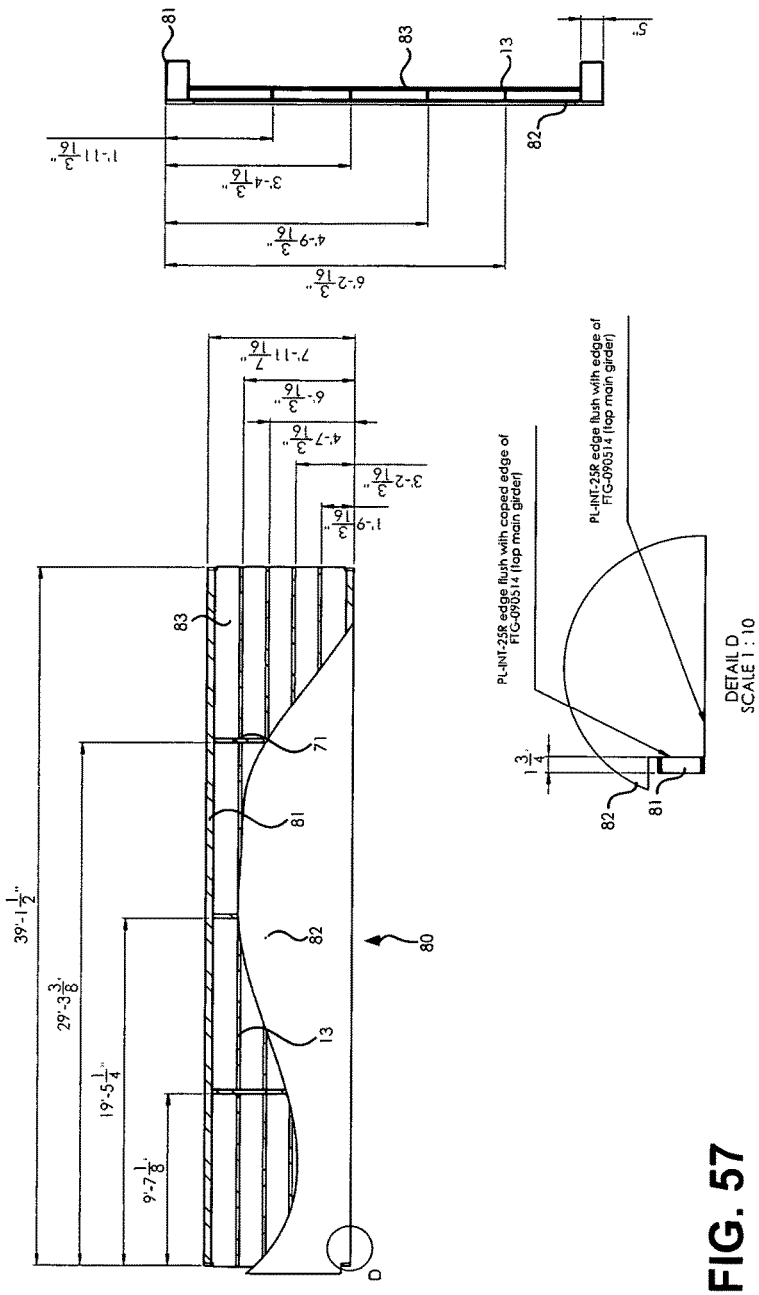

FIG. 57 illustrates the middle top assembly, including middle top main girders, channeled floor/roof support beams, middle floor/roof support beams, roof, and middle interior roof.

Figure 58:
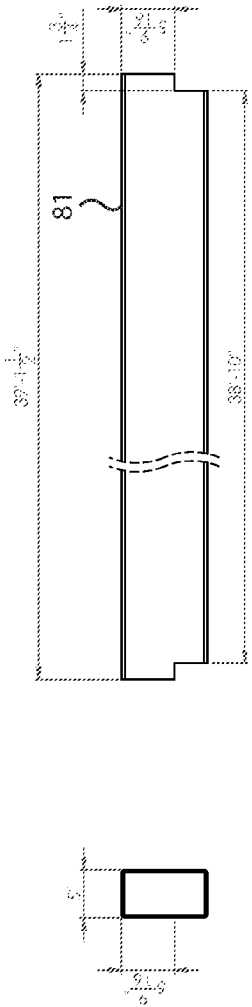

FIG. 58 illustrates the middle top main girder.

Figure 59:
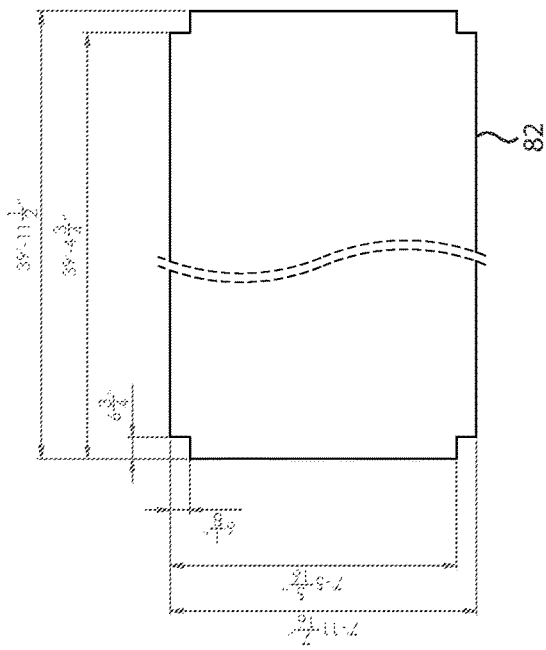

FIG. 59 illustrates the roof.

Figure 60:
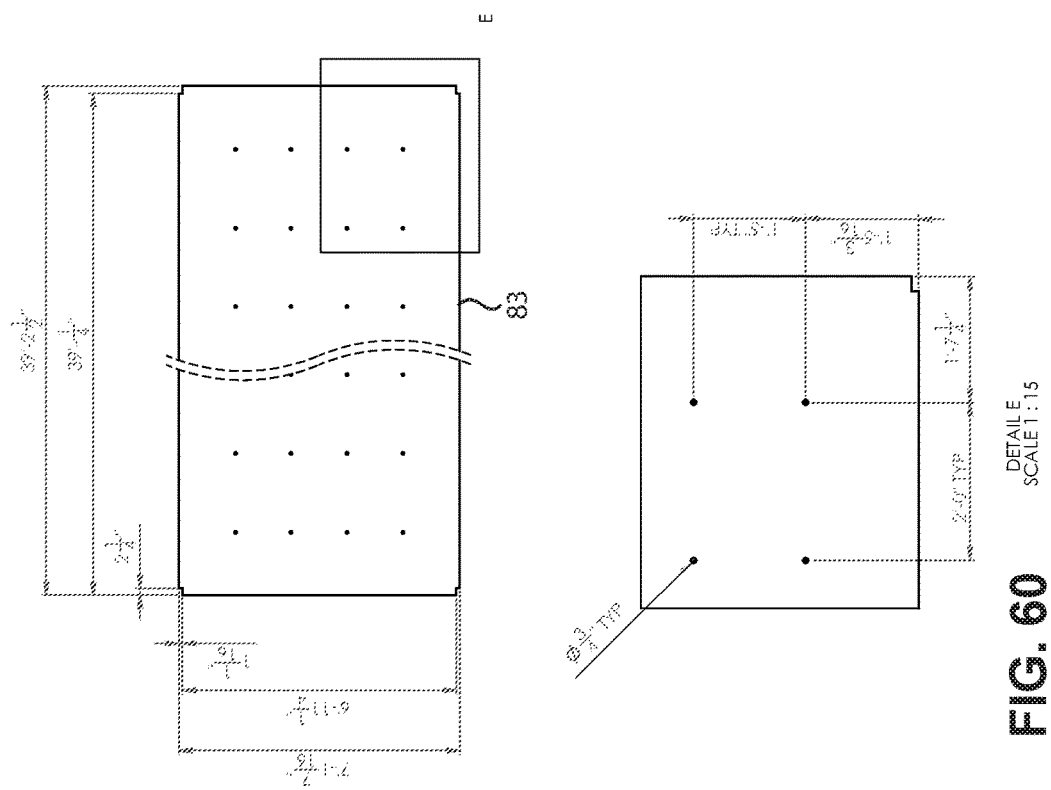

FIG. 60 illustrates the middle interior roof.

Figure 61:
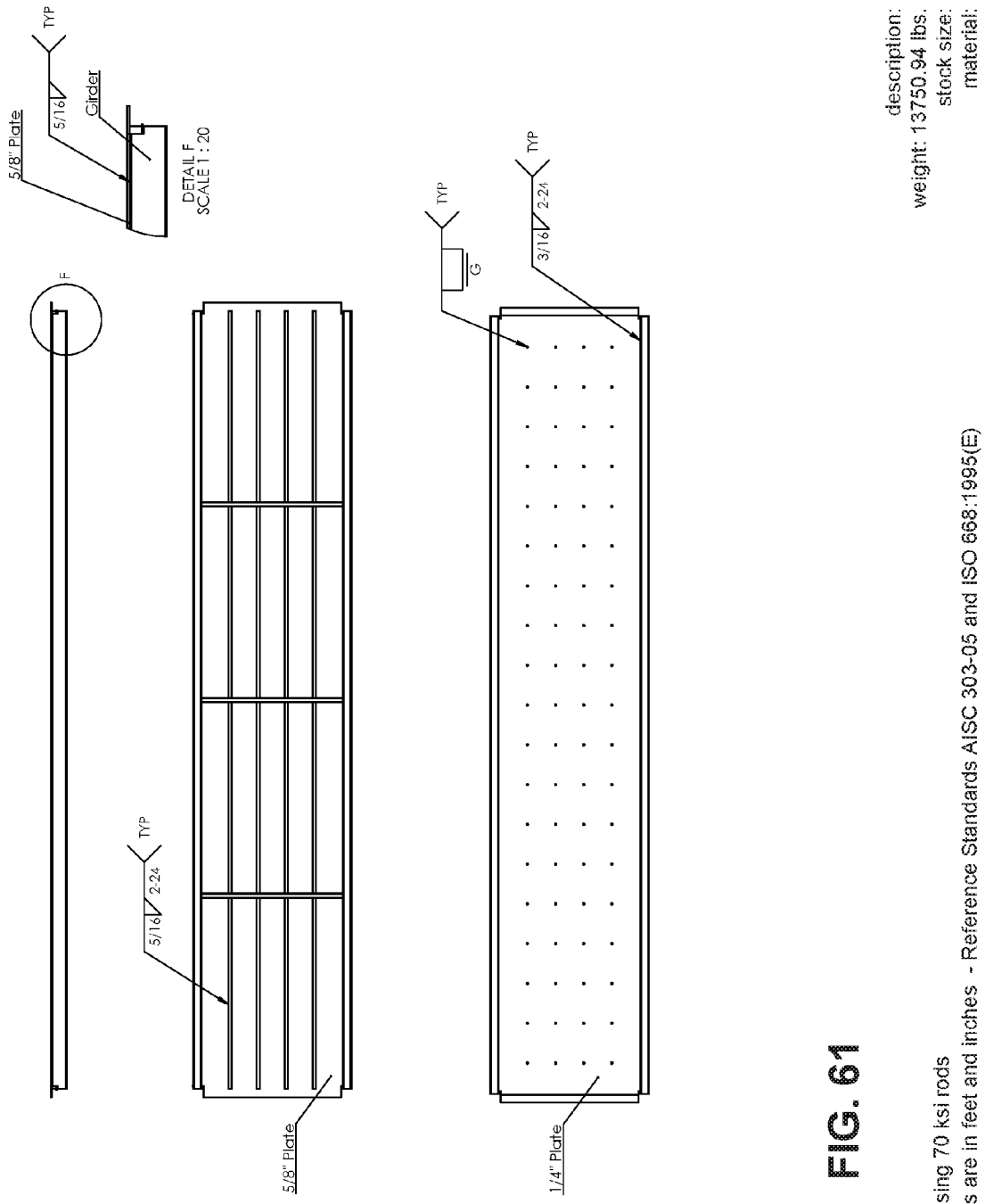

FIG. 61 illustrates the middle top assembly welds.

Figure 62:
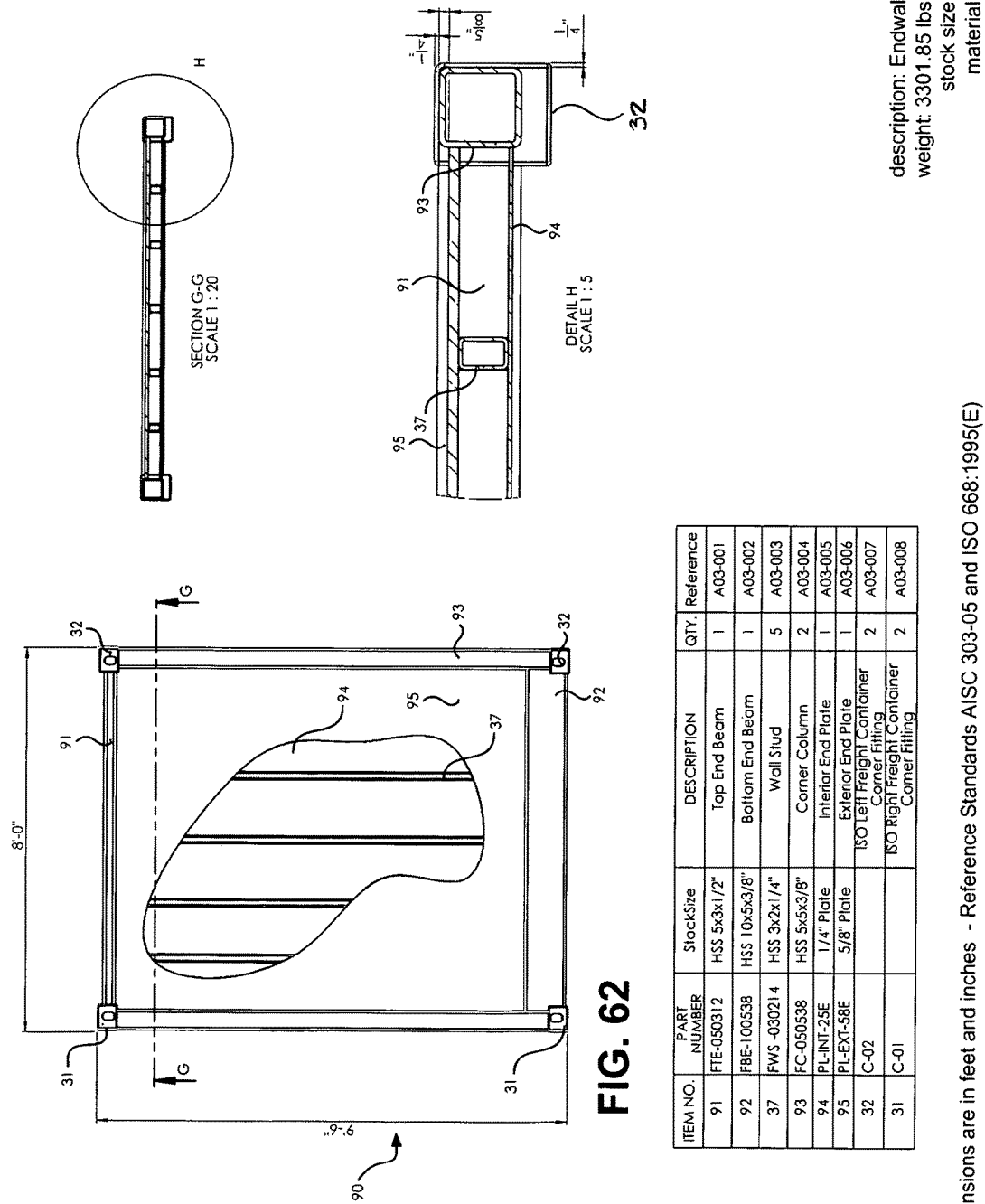

FIG. 62 illustrates the middle end wall assembly without openings, including top end beam, bottom end beam, wall stud, middle corner column, interior end plate, exterior end plate, ISO right freight container corner fittings, and ISO left freight container corner fittings.

Figure 63:
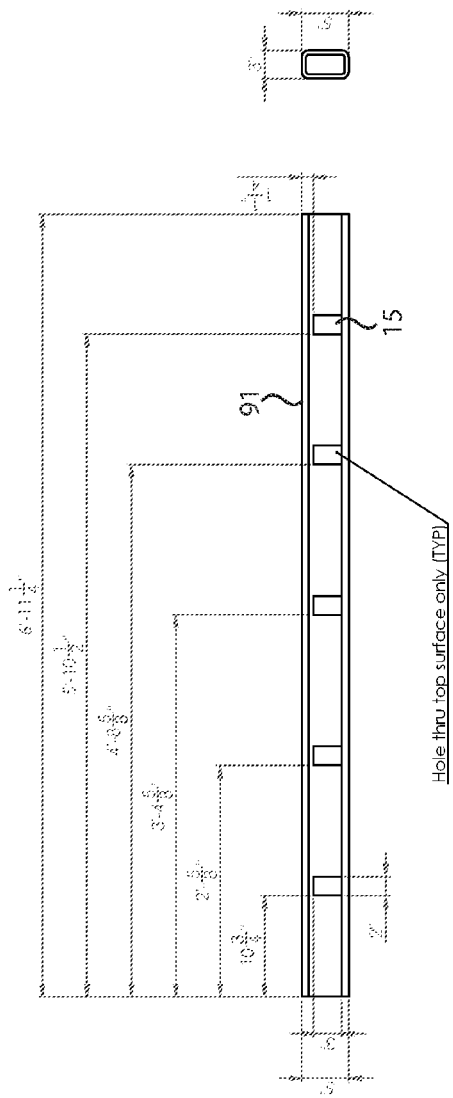

FIG. 63 illustrates the top end beam.

Figure 64:
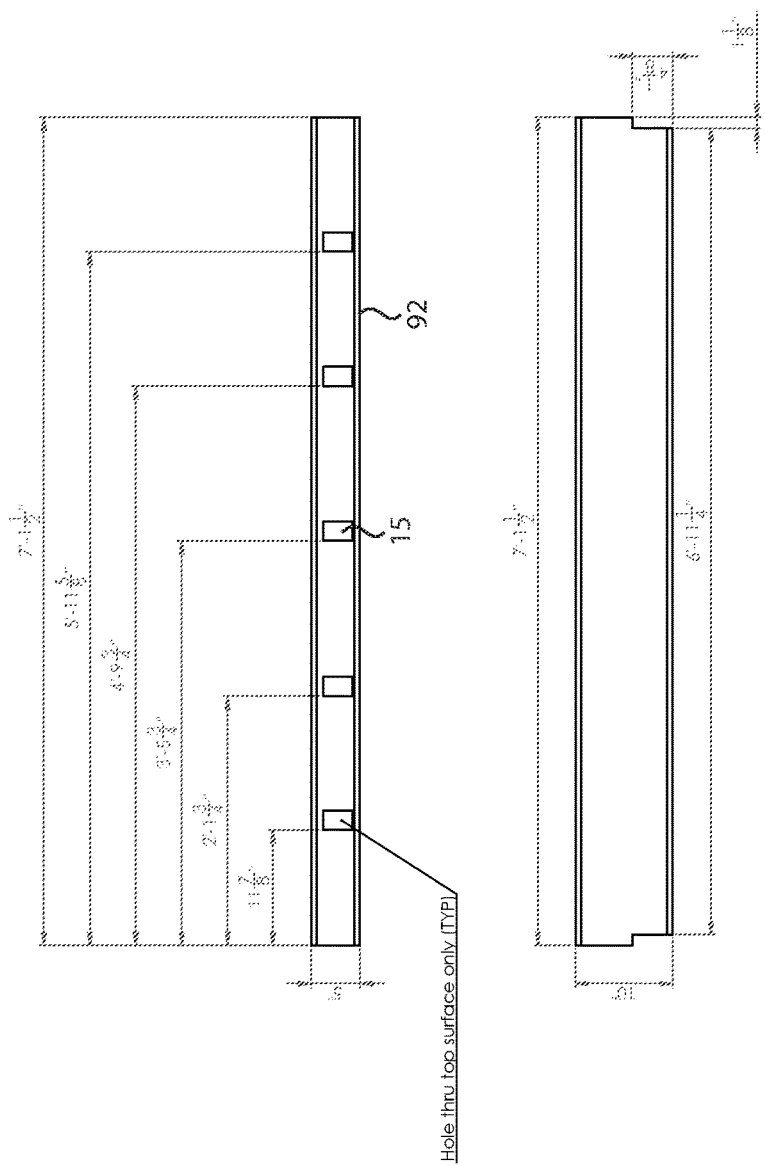

FIG. 64 illustrates the bottom end beam.

Figure 65:
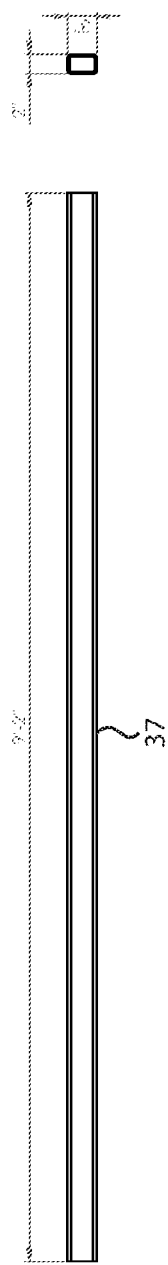

FIG. 65 illustrates the wall stud.

Figure 66:
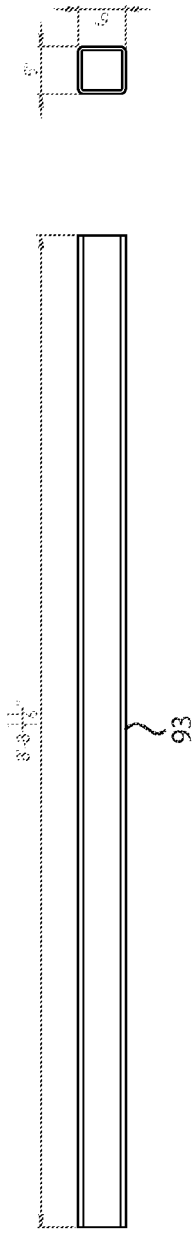

FIG. 66 illustrates the middle corner column.

FIG. 67 illustrates the interior end plate.

FIG. 68 illustrates the exterior end plate.

Figure 69:
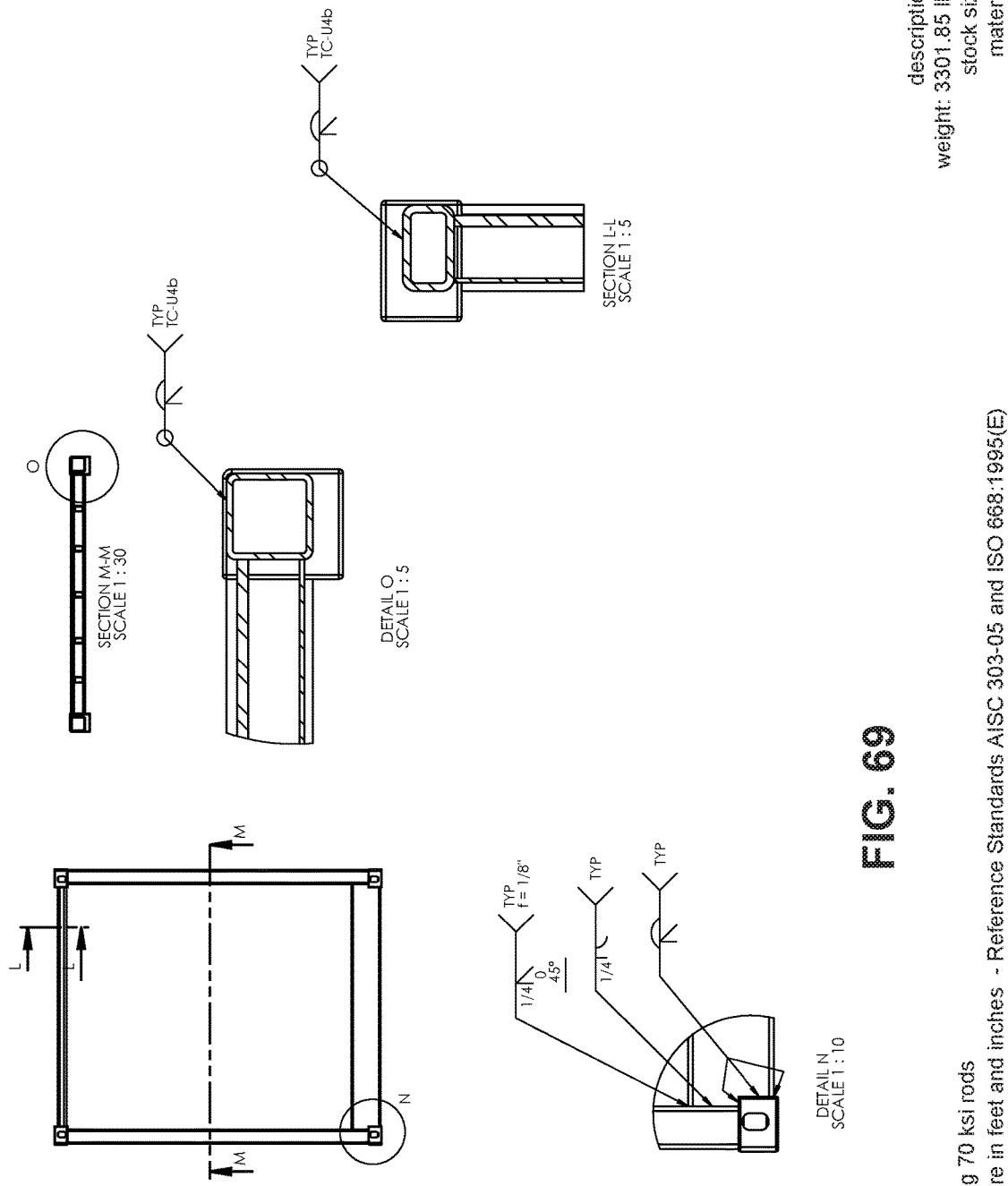

FIG. 69 illustrates the endwall welds.

FIGS. 70a-72 illustrate the components of an exemplary embodiment of modular anti-ballistic shelter system.

Figure 73A:
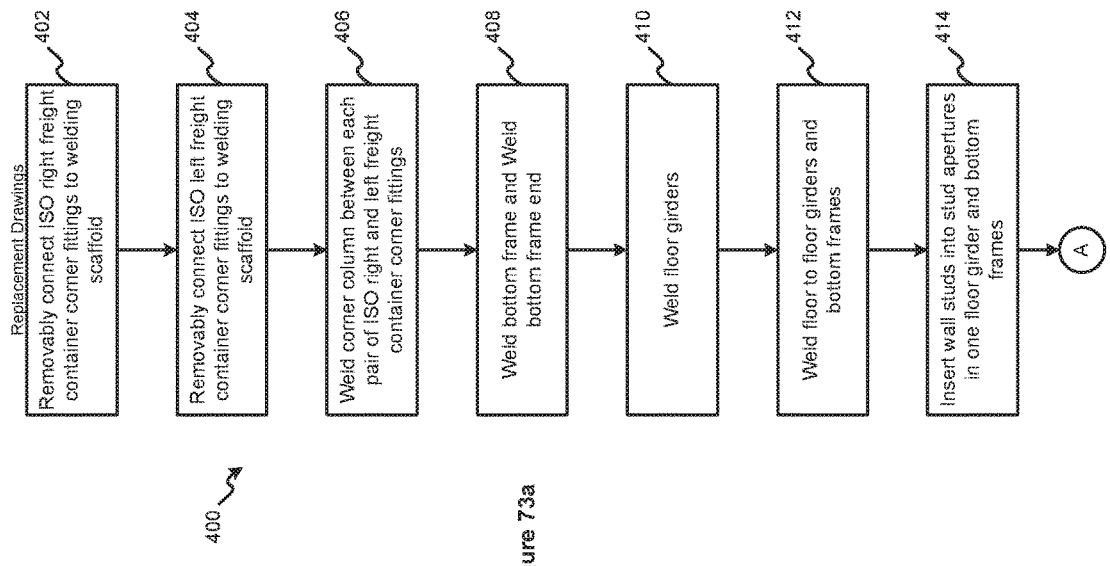
Figure 73B:
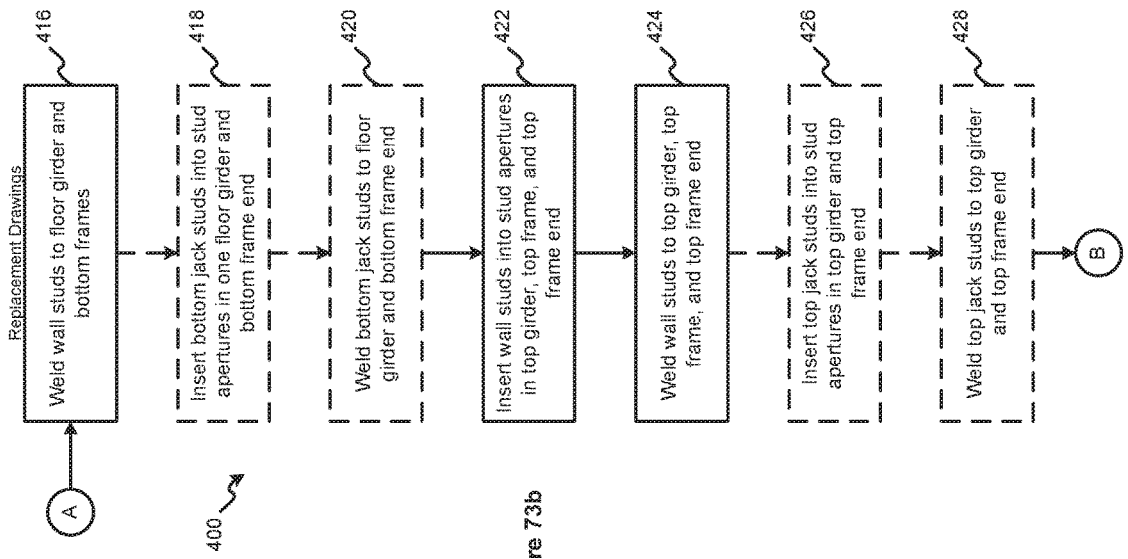
Figure 73C:
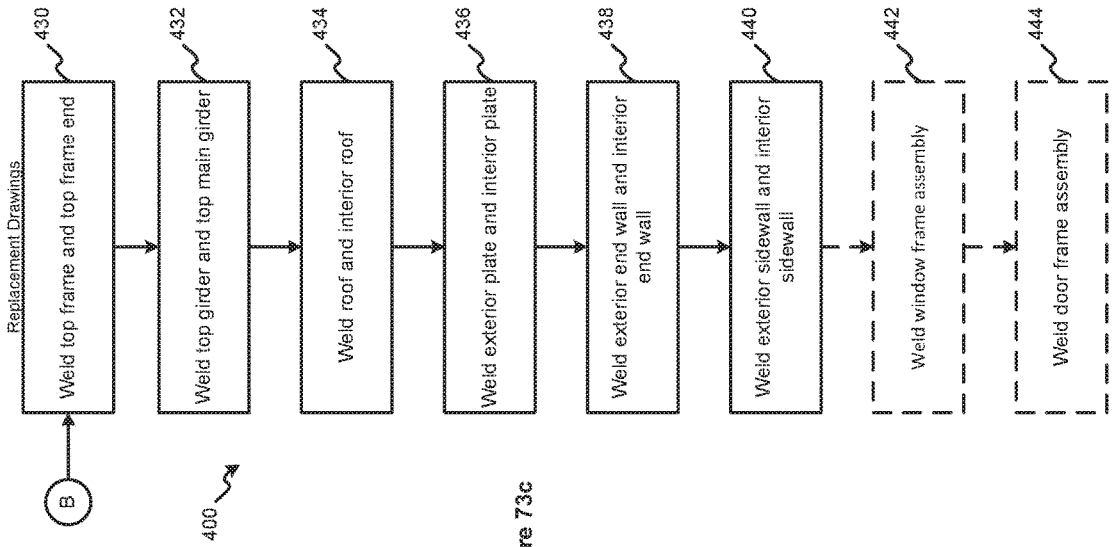

FIGS. 73a-73c illustrate a flowchart of an exemplary method for making the end unit for the modular anti-ballistic shelter system.

TERMS OF ART

As used herein, the term "hollow structural cross-section" refers to a measurement of a hollow member including a first dimension, a second dimension, and a wall thickness.

As used herein, the term "inches apart at center" refers to the distance between the centers of spaced structures.

As used herein, the term "ISO freight container corner fitting" refers to a cast metal fitting forming the corner of a structure, having a hollow interior and at least one elongated aperture allowing insertion of the mobile portion of a twistlock.

As used herein, the term "twistlock" refers to a two- or three-portion connector, wherein at least one mobile portion of the connector may be inserted into an elongated aperture in a structure and rotated to prevent removal of the mobile portion from the elongated aperture and separation of the connector from the structure.

As used herein, the term "welding interface" refers to a joint created by welding to or more pieces of metal together.

As used herein, the term "welding scaffold" refers to a removable frame work used to hold the components of a welded structure in place during fabrication.

DETAILED DESCRIPTION OF THE INVENTION

Figure 1:
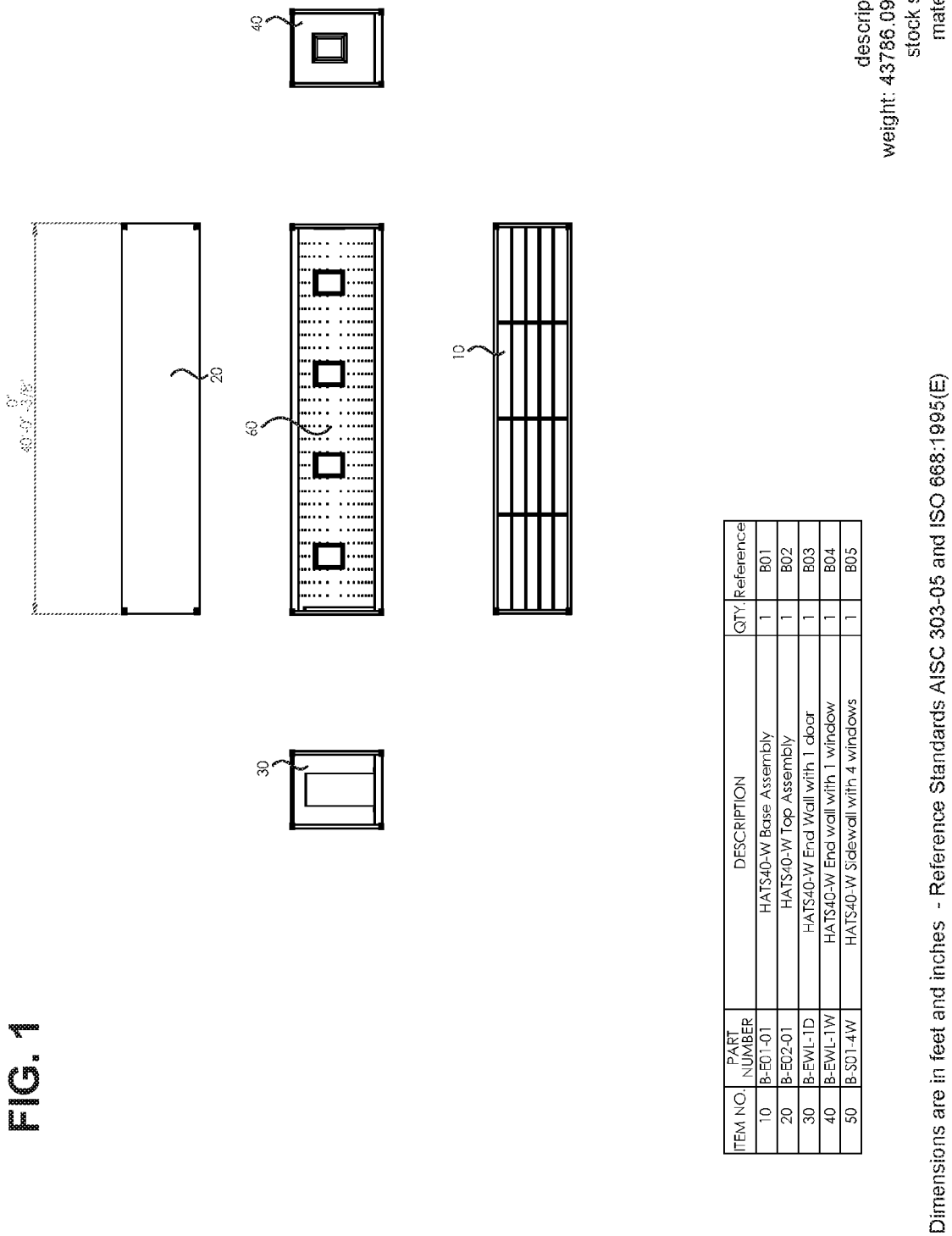

FIGS. 1-49 illustrate the components of an exemplary embodiment of end unit 200 for modular anti-ballistic shelter system 100. FIG. 1 illustrates end unit 200 including base assembly 10, top assembly 20, endwall assembly 30 with door, endwall assembly 40 with window, and sidewall assembly 60 with windows. End unit 200 has a weight of approximately 43,786 lbs.

Figure 2:
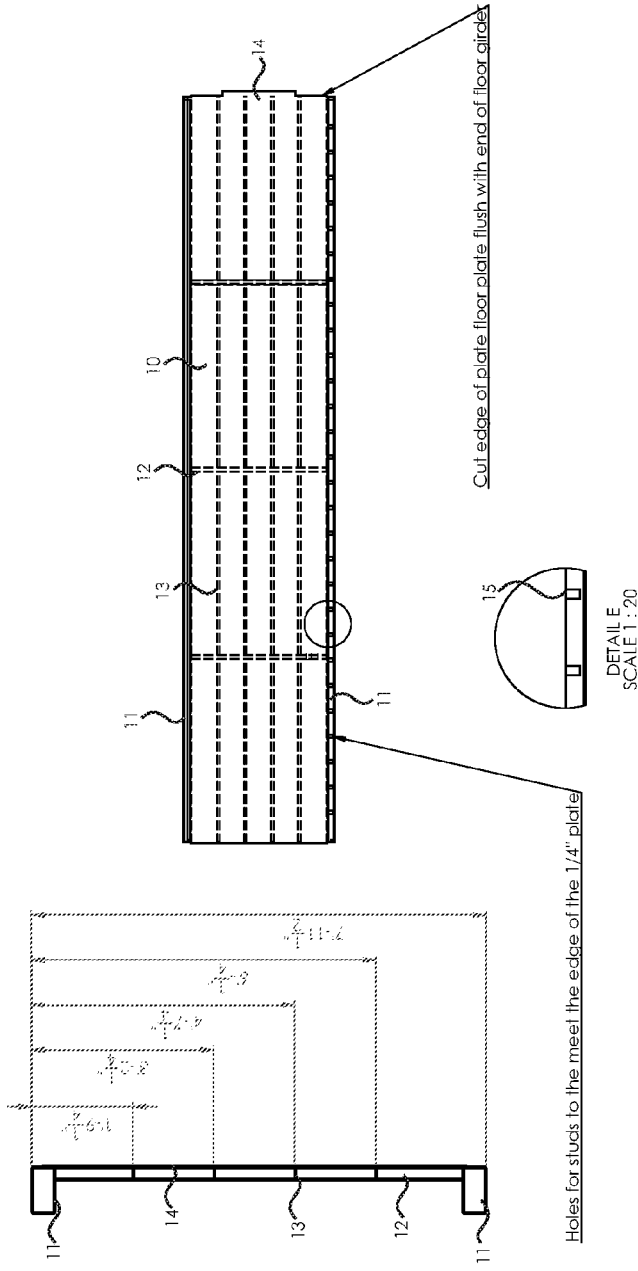

FIG. 2 illustrates base assembly 10 including floor girders 11, floor/roof support beams 12, channeled floor/roof support beams 13, and floor 14. Base assembly 10 has a weight of approximately 6,900 lbs.

Figure 3:
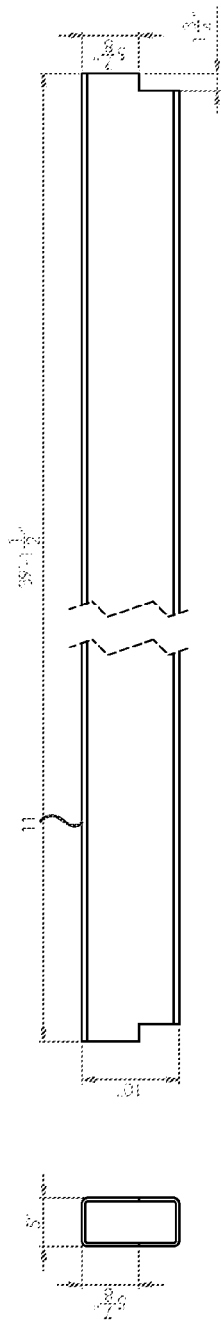
Figure 4:
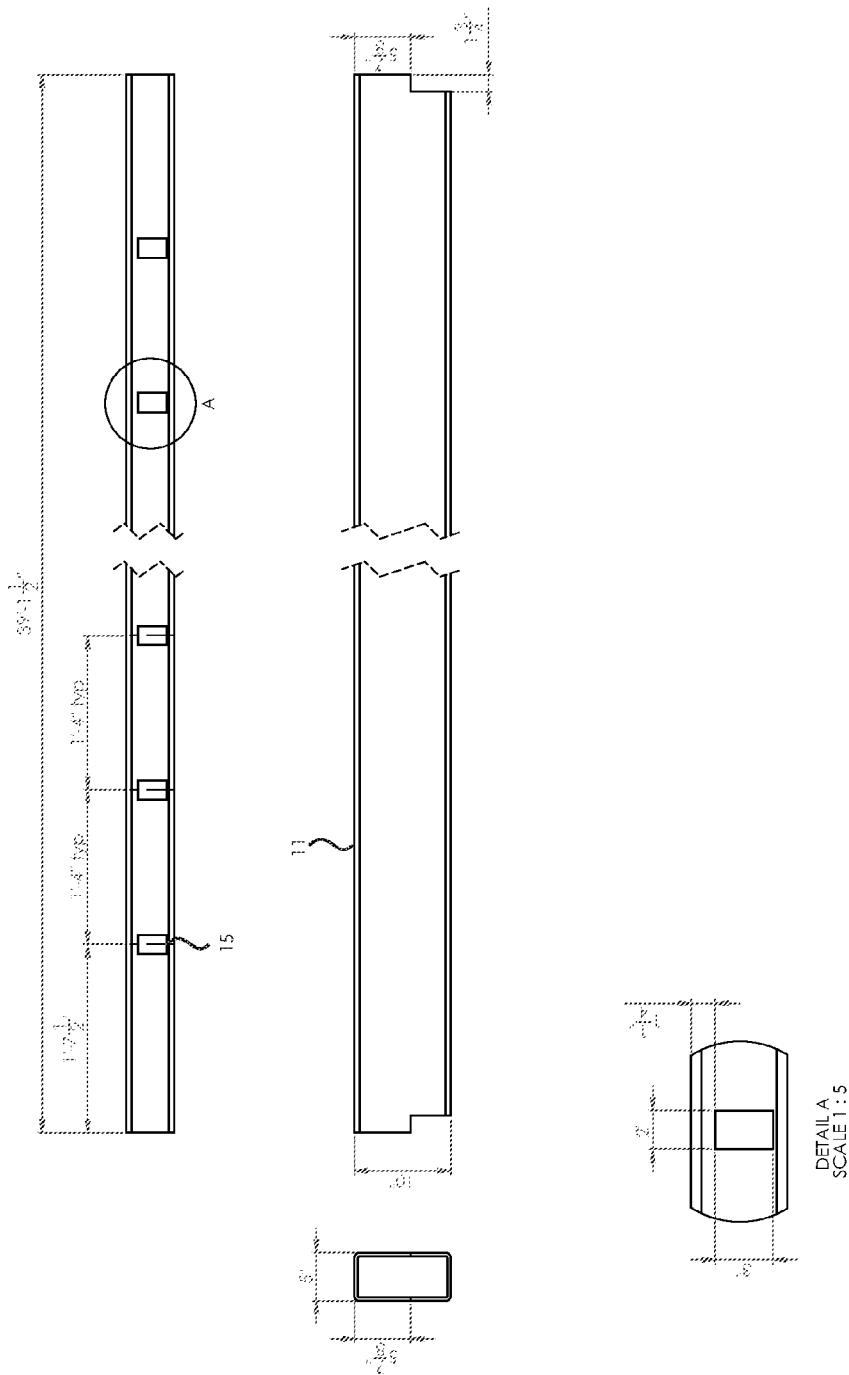
Figure 5:
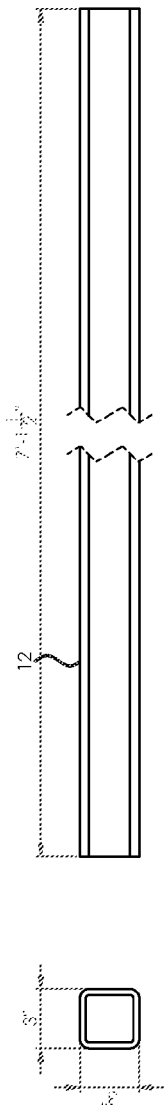
Figure 6:
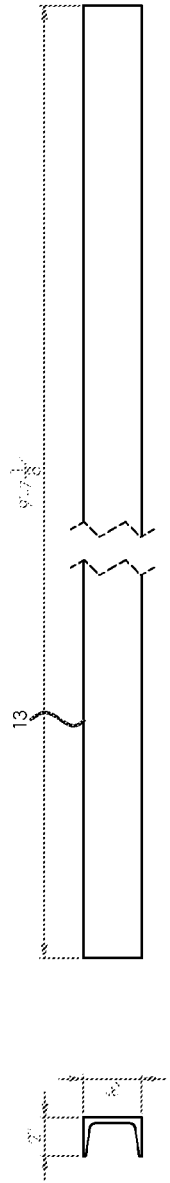
Figure 7:
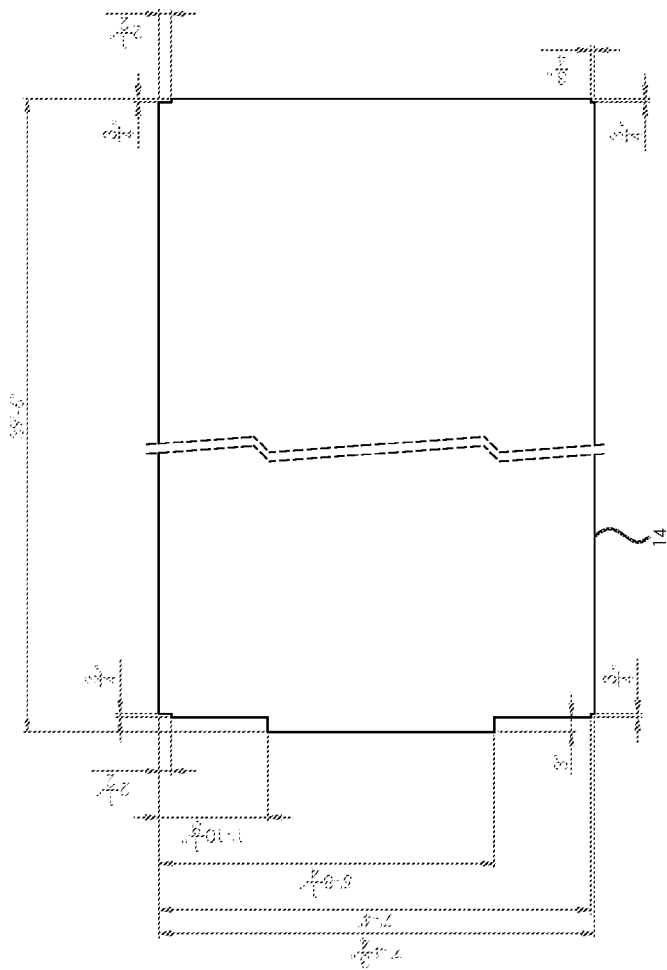
Figure 8:
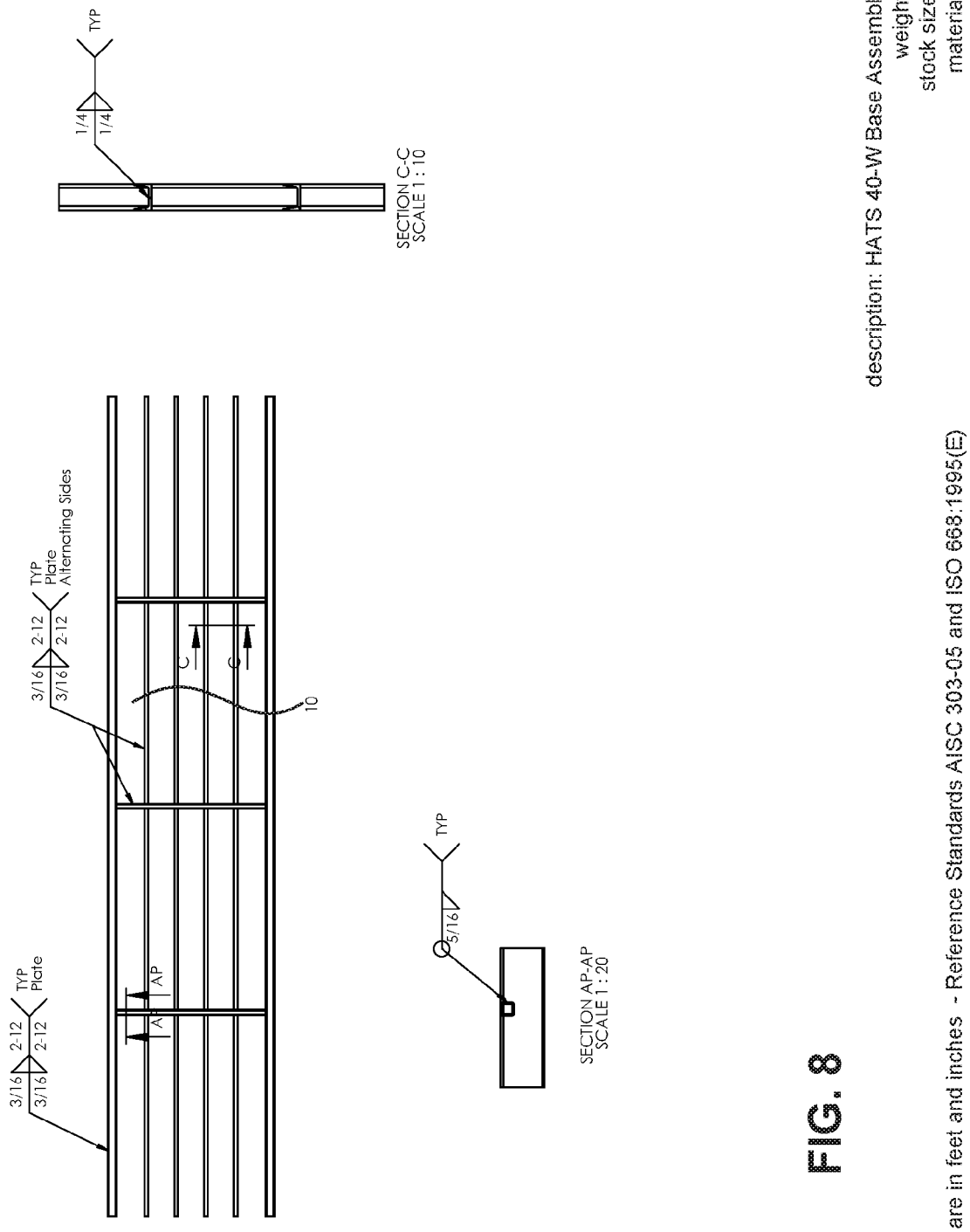

FIGS. 3 and 4 illustrate floor girders 11, which have a length of 39.125 feet and a hollow structural cross-section of 10 by 5 by ⅜ inches. As seen in FIG. 4, floor girder 11 may include multiple stud apertures 15 spaced apart 16 inches apart at center. This critical dimension provides optimum structural integrity to any assembly utilizing stud apertures 15 without increasing weight to the point that it violates ISO standards. FIG. 5 illustrates floor/roof support beam 12, which has a length of 7.125 feet and a hollow structural cross-section of 3 by 3 by 5/16 inches. FIG. 6 illustrates channeled floor/roof support beam 13, which has a length of 9.59375 feet, a width of 3 inches, a height of 2 inches, and a weight of 7.1 lbs. per foot of length. FIG. 7 illustrates floor 14, which has dimensions of 39.5 feet by 7.395833 feet. FIG. 8 illustrates base assembly 10 welds.

Figure 9:
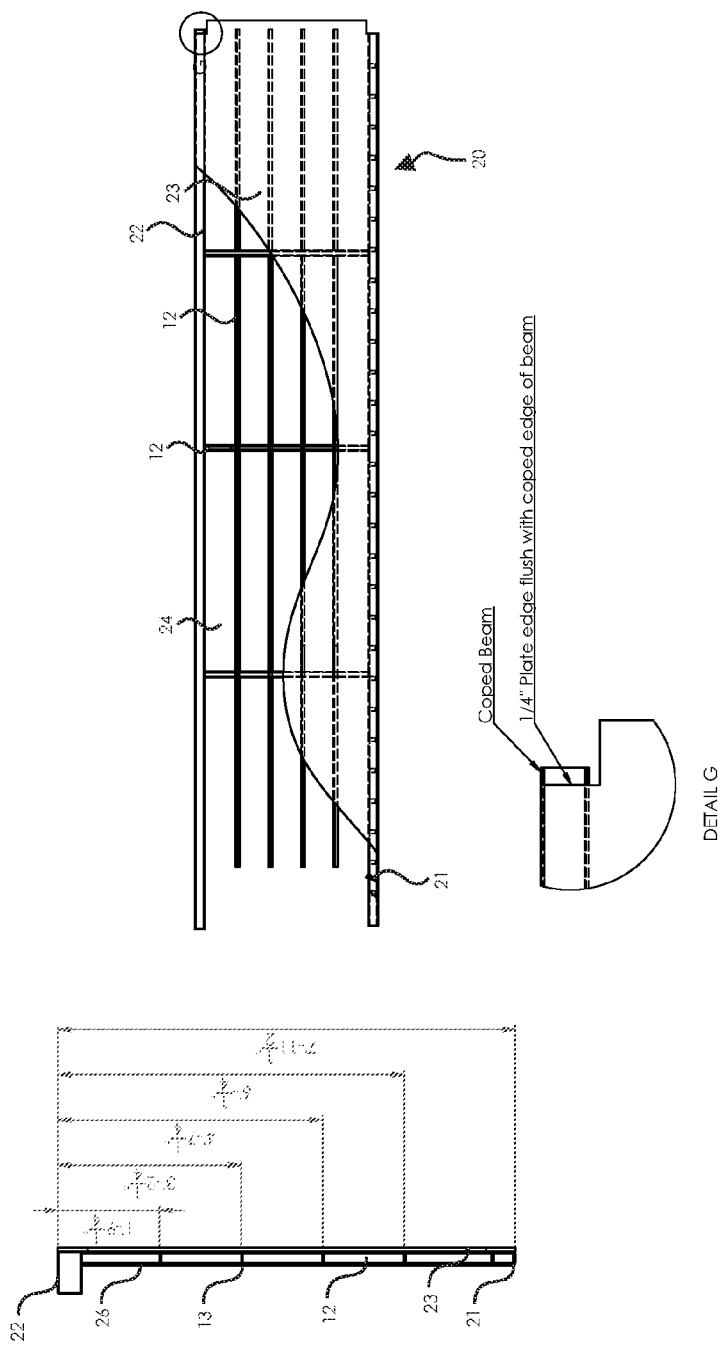

FIG. 9 illustrates top assembly 20 including floor/roof support beams 12, channeled floor/roof support beams 13, top girder 21, top main girder 22, roof 23, and interior roof 24. Top assembly 20 has a weight of approximately 13,719 lbs.

Figure 10:
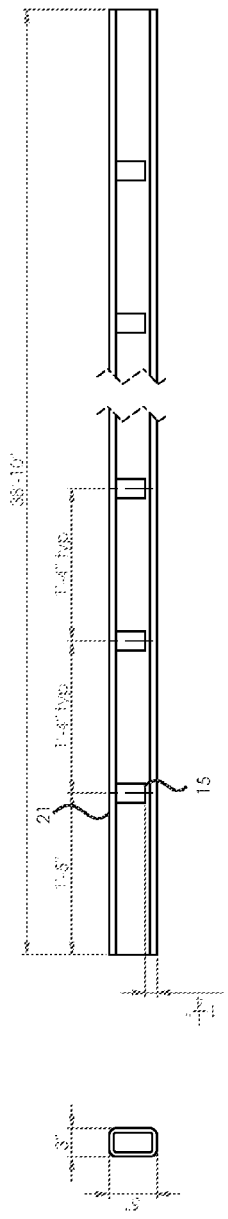
Figure 11:
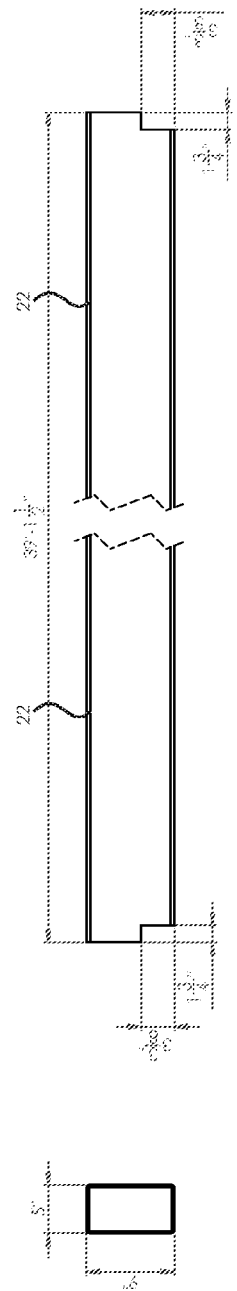
Figure 12:
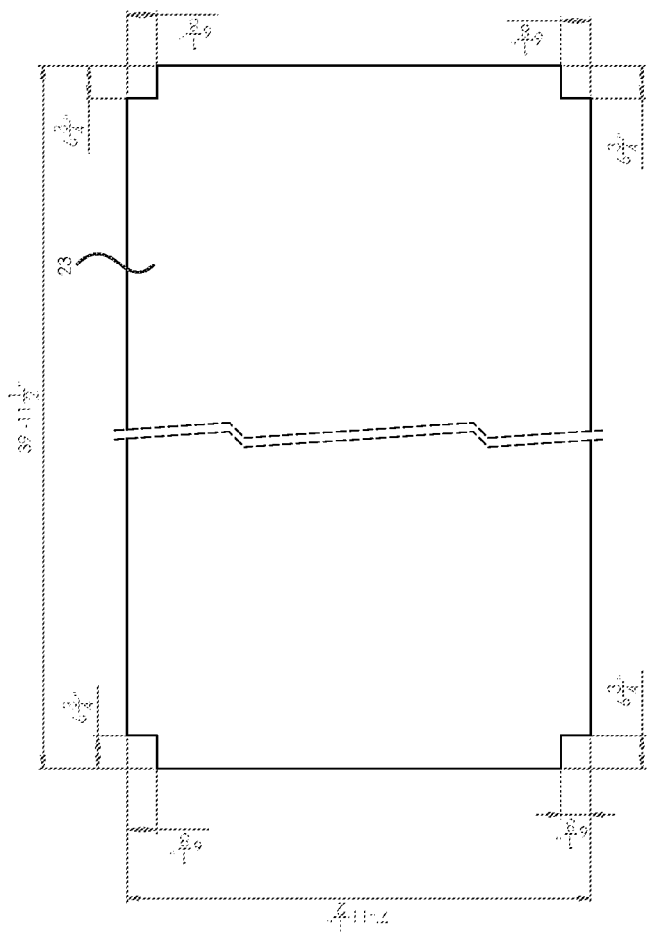
Figure 13:
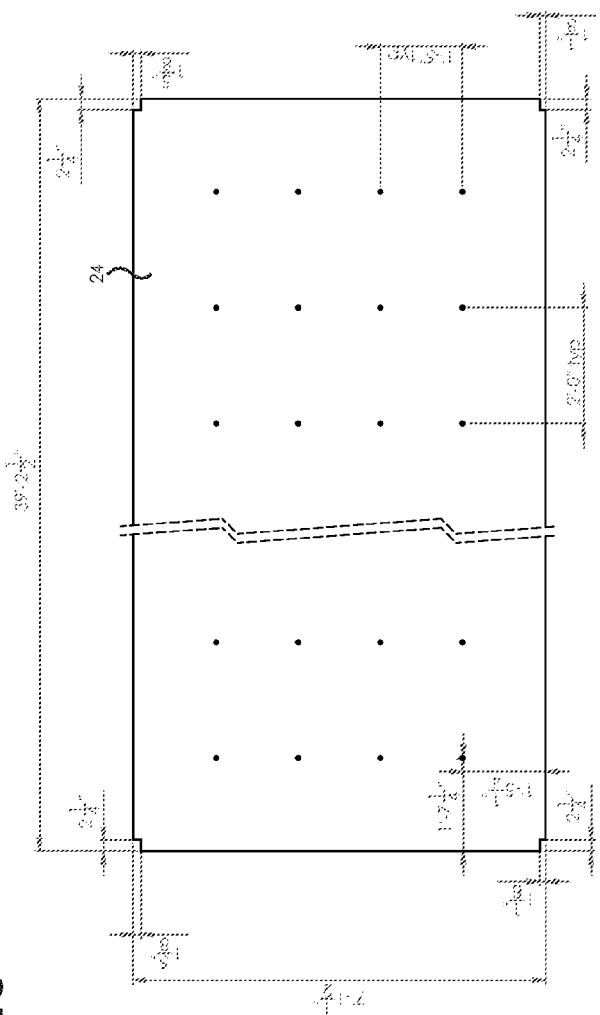

FIG. 10 illustrates top girder 21, which has a length of 39.833 feet and a hollow structural cross-section of 5 by 3 by ½ inches. Top girder 21 includes multiple stud apertures 15 spaced apart 16 inches apart at center. FIG. 11 illustrates top main girder 22, which has a length of 39.125 feet and a hollow structural cross-section of 9 by 5 by ¼ inches. FIG. 12 illustrates roof 23, which has dimensions of 39.95833 feet by 7.95833 feet. FIG. 13 illustrates interior roof 24, which has dimensions of 39.20833 feet by 7.125 feet. FIG. 14 illustrates top assembly 20 welds.

FIG. 15 illustrates end wall assembly 30 with door, including ISO right freight container corner fitting 31, ISO left freight container corner fitting 32, door frame assembly 33, bottom frame 34 for middle door, corner column 35, top frame 36 for middle door, wall studs 37, exterior plate 38 for middle door, and interior plate 39 for middle door. In the exemplary embodiment, end wall assembly 30 with door has a weight of approximately 5,472 lbs.

Exterior plate for middle door 38 and interior plate for middle door 39 are made from sheets of steel 0.0625 inches to 1 inch thick. Thicker sheets (0.5 inches to 1 inch thick) may be used for end units 200 which will see deployment in areas where more protection may be needed. In embodiments without openings in an endwall assembly, additional wall studs 37 may be added, and exterior end plate 38 and interior plate 39 have neither punchouts nor cutouts for insertion of door frame assembly 33.

Figure 21:
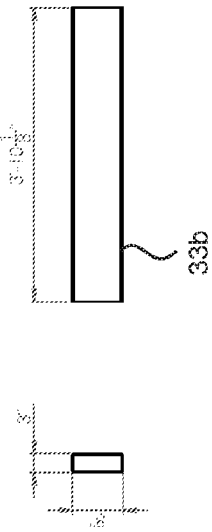

FIG. 16 illustrates a cross section of end wall assembly 30 with door. FIG. 17 illustrates ISO right freight container corner fitting 31. FIG. 18 illustrates ISO left freight container corner fitting 32. FIG. 19 illustrates door frame assembly 33, which includes two vertical door frames 33a and one door header 33b. Door frame assembly 33 has a height of 7.25 feet and a width of 3.84375. FIG. 20 illustrates vertical door frame 33a, which has a height of 7 feet and a hollow structural cross-section of 8 by 3 by ¼ inches. FIG. 21 illustrates door header 33b, which has a length of 3.84375 feet and a hollow structural cross-section of 8 by 3 by ¼ inches FIG. 22 illustrates door frame assembly 33 welds. FIG. 23 illustrates bottom frame 34 for middle door, which has a length of 6.9270833 feet and a hollow structural cross-section of 10 by 5 by ⅜ inches. Bottom frame 34 for middle door includes multiple stud apertures 15. FIG. 24 illustrates corner column 35, which has a height of 9.166 feet and a hollow structural cross-section of 5 by 5 by ⅜ inches. FIG. 25 illustrates top frame 36 for middle door, which has a length of 6.9270833 feet and a hollow structural cross-section of 5 by 3 by ⅜ inches. Top frame for middle door 36 includes multiple stud apertures 15.

FIG. 26 illustrates wall stud 37, which has a height of 9.166 feet and a hollow structural cross-section of 3 by 2 by ¼ inches. Wall studs 37 are inserted into stud apertures 15 and welded into place during assembly. Wall studs 37 provide critical anti-ballistic, -blast, and -forced entry properties. FIG. 27 illustrates exterior plate 38 for middle door, which has dimensions of 7.125 feet by 8.270833 feet. FIG. 28 illustrates interior plate 39 for middle door, which has dimensions of 7.125 feet by 8.270833 feet. FIG. 29-31 illustrate end wall with door 30 welds.

FIG. 32 illustrates end wall assembly 40 with window, including bottom frame end 41, top frame end 42, wall studs 37, bottom jack studs 43, top jack studs 44, exterior end wall 45, interior end wall 46, and window frame assembly 50. In the exemplary embodiment, end wall assembly 40 with window has a weight of approximately 3,507 lbs.

In the exemplary embodiment, exterior end wall 45 and interior end wall 46 are made from sheets of steel 0.0625 inches to 1 inch thick. Thicker sheets (0.5 inches to 1 inch thick) may be used for end units 200 which will see deployment in areas where more protection may be needed. In embodiments without openings in an endwall assembly, wall studs 37 replace bottom jack studs 43 and top jack studs 44, and exterior end wall 45 and interior end wall 46 have neither punchouts nor cutouts for insertion of window frame assembly 50.

FIG. 33 illustrates bottom frame end 41, which has a length of 7.125 feet and a hollow structural cross-section of 10 by 5 by ⅜ inches. Bottom frame end 41 includes multiple stud apertures 15. FIG. 34 illustrates top frame end 42, which has a length of 6.9270833 feet and a hollow structural cross-section of 5 by 3 by ½ inches. Top frame end 42 includes multiple stud apertures 15.

FIG. 35 illustrates window frame assembly 50, which includes horizontal window frames 51, vertical window frames, 52, vertical window moldings 53, and horizontal window moldings 54. FIG. 36 illustrates horizontal window frame 51, which has a length of 2.4166 feet and a hollow structural cross-section of 3 by 2 by ¼ inches. FIG. 37 illustrates vertical window frame 52, which has a length of 2.4375 feet and a hollow structural cross-section of 3 by 2 by ¼ inches. FIG. 38 illustrates vertical window molding 53. FIG. 39 illustrates horizontal window molding 54. FIG. 40 illustrates window frame assembly 50 welds. Window frame assembly 50 also includes glass 63 or another transparent material.

FIG. 41 illustrates bottom jack stud 43, which has a height of 3.9166 feet and a hollow structural cross-section of 3 by 2 by ¼ inches. Bottom jack studs 43 are inserted into stud apertures 15 and welded into place during assembly. Bottom jack studs 43, similarly to wall studs 37, provide critical anti-ballistic, -blast, and -forced entry properties for areas which include a window assembly 50. FIG. 42 illustrates top jack stud 44, which has a height of 2.28125 feet and a hollow structural cross-section of 3 by 2 by ¼ inches. Top jack studs 44 are inserted into stud apertures 15 and welded into place during assembly. Top jack studs 44, similarly to wall studs 37 and bottom jack studs 43, provide critical anti-ballistic, -blast, and -forced entry properties. FIG. 43 illustrates exterior end wall 46, which has dimensions of 7.125 feet by 8.270833 feet. FIG. 44 illustrates interior end wall 47, which has dimensions of 7.125 feet by 8.25 feet. FIG. 45 illustrates a cross section of end wall assembly 40 with window.

FIG. 46 illustrates sidewall assembly 60 with windows, window frame assemblies 50, wall studs 37, bottom jack studs 43, top jack studs 44, interior sidewall 61 with punchouts, and exterior sidewall 62 with cutouts. In the exemplary embodiment, sidewall assembly 60 with windows has a weight of approximately 14,185 lbs.

In the exemplary embodiment, interior sidewall 61 and exterior sidewall 62 are made from sheets of steel 0.0625 inches to 1 inch thick. Thicker sheets (0.5 inches to 1 inch thick) may be used for end units 200 which will see deployment in areas where more protection may be needed. In embodiments without openings in a sidewall assembly, wall studs 37 replace bottom jack studs 43 and top jack studs 44, and interior and exterior sidewalls 61 and 62 have neither punchouts nor cutouts for insertion of window frame assembly 50.

FIG. 47 illustrates interior sidewall 61, which has dimensions of 39.125 feet by 8.25 feet. FIG. 48 illustrates exterior sidewall, which has dimensions of 39.125 feet by 8.25 feet. FIG. 49 illustrates sidewall assembly 60 with windows welds.

FIGS. 50-69 illustrate the components of an exemplary embodiment of optional middle unit 300 for modular anti-ballistic shelter system 100. While only two end units 200 are necessary for system 100, in certain embodiments, a user may insert one or more middle units 300 between end units 200 to provide additional space in system 100. Broadly, middle units 300 are similar to end units 200, but lack sidewall assembly 60 and any attendant structures. FIG. 50 illustrates optional middle unit 300 including middle base assembly 70, middle top assembly 80, and end walls 90 without openings. Middle unit 300 has a weight of approximately 27,485 lbs.

FIG. 51 illustrates middle base assembly 70 including floor girders 11, channeled floor/roof support beams 13, middle floor/roof support beams 71, and middle floor 72. Middle base assembly 70 has a weight of approximately 7,130 lbs.

FIG. 52 illustrates floor girder 11. FIG. 53 illustrates channeled floor/roof support beam 13. FIG. 54 illustrates middle floor/roof support beam 71, which has a length of 7.11979166 feet and a hollow structural cross-section of 3 by 3 by 5/16 inches. FIG. 55 illustrates middle floor 72, which has dimensions of 39.20833 feet by 7.953125 feet. FIG. 56 illustrates middle base assembly 70 welds.

FIG. 57 illustrates middle top assembly 80, including middle top main girders 81, channeled floor/roof support beams 13, middle floor/roof support beams 71, middle roof 82, and middle interior roof 83. Middle top assembly 80 has a weight of approximately 13,750 lbs.

FIG. 58 illustrates middle top main girder 81, which has a length of 39.125 feet and a hollow structural cross-section of 9 by 5 by ¼ inches. FIG. 59 illustrates middle roof 82, which has dimensions of 39.95833 feet by 7.953125 feet. FIG. 60 illustrates middle interior roof 83, which has dimensions of 39.20833 feet by 7.953125 feet. FIG. 61 illustrates middle top assembly 80 welds.

FIG. 62 illustrates middle end wall assembly 90 without openings, including top end beam 91, bottom end beam 92, wall studs 37, middle corner column 93, interior end plate 94, exterior end plate 95, ISO right freight container corner fitting 31, and ISO left freight container corner fitting 32. Each middle end wall assembly 90 without openings has a weight of approximately 3,301 lbs.

FIG. 63 illustrates top end beam 91, which has a length of 6.9375 feet and a hollow structural cross-section of 5 by 3 by ½ inches. Top end beam 91 includes multiple stud apertures 15 spaced apart 12.25 inches to 16 inches apart at center. FIG. 64 illustrates bottom end beam 92, which has a length of 7.125 feet and a hollow structural cross-section of 10 by 5 by ⅜ inches. Bottom end beam 92 includes multiple stud apertures 15 spaced apart 12.25 inches to 16 inches apart at center. FIG. 65 illustrates wall stud 37. FIG. 66 illustrates middle corner column 93, which has a height of 8.72395833 feet and a hollow structural cross-section of 5 by 5 by ⅜ inches. FIG. 67 illustrates interior end plate 94, which has dimensions of 8.27604166 feet by 7.125 feet. FIG. 68 illustrates exterior end plate 95, which has dimensions of 8.27604166 feet by 7.125 feet. FIG. 69 illustrates endwall 90 welds.

Wall studs 37 are welded into place using weld type A. Each weld type A is a fillet weld 3 inches long and 0.25 inches wide located at an interface between hollow wall stud 37 and whatever hollow member stud aperture 15 is located in. Because wall studs 37 extend through stud apertures 15 into a hollow member, even if a weld attaching wall studs 37 is defective or fails, end unit 200 and/or middle unit 300 maintains sufficient structural integrity to resist ballistic, blast and/or forced entry threats. The engagement and attachment between wall studs 37 and stud apertures 15 is sufficiently strong, even without a structural quality weld attaching wall studs 37, to provide end unit 200 and/or middle unit 300 with suitable blast, ballistic and forced entry protection performance.

Figure 70A:
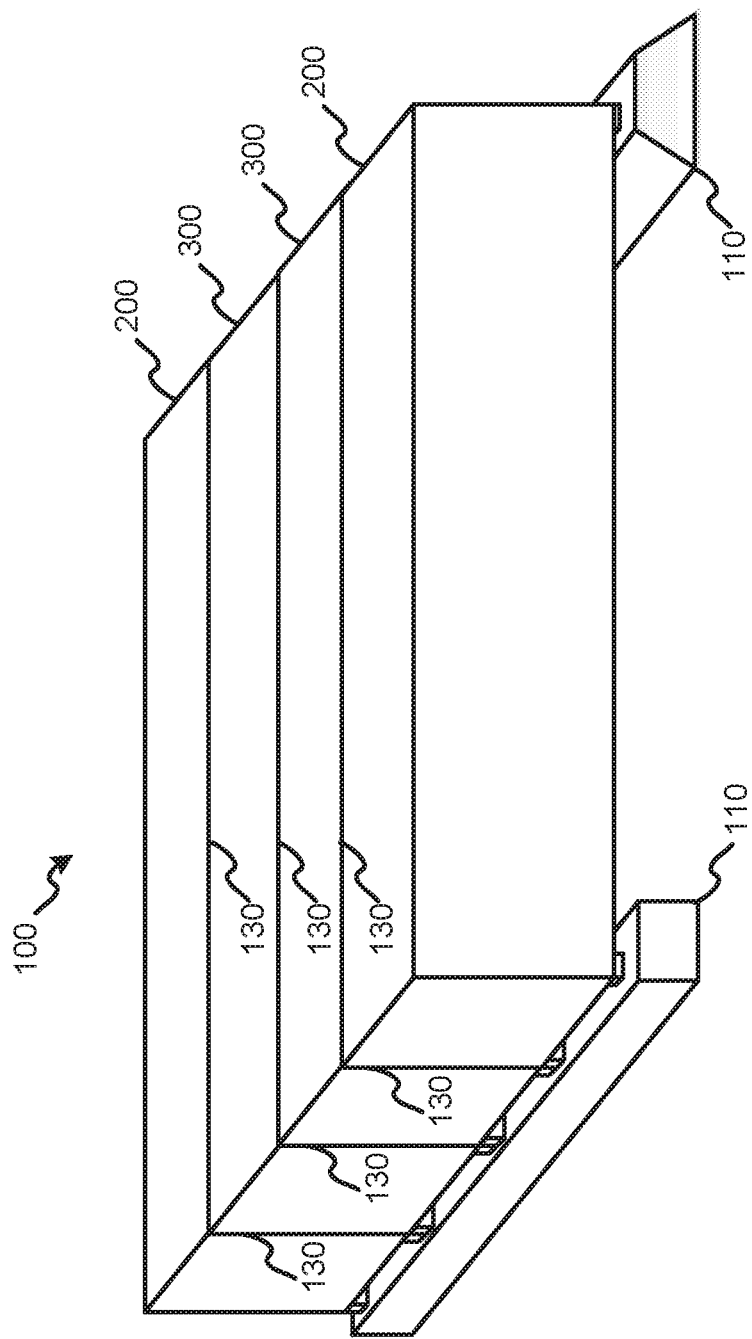

FIGS. 70a-72 illustrate the components of an exemplary embodiment of modular anti-ballistic shelter system 100. FIG. 70a illustrates an exemplary embodiment incorporating two middle units 300 between two end units 200, for a "4×1" system 100. FIG. 70b illustrates an exemplary embodiment incorporating two end units 200 stacked atop another two end units 200, for a "2×2" system 100. Still other embodiments may use more or fewer middle units 300, such as a "2×1" system 100 using only two end units or a "4×2" system 100, which would use four end units 200 and four middle units 300.

System 100 includes at least one footer 110 embedded in the ground below end unit 200 and/or middle unit 300. Footer 110 is a concrete platform 111 having at least one metal protrusion 112 extending therefrom. Footer 110 extends below first or second end wall assembly 30 or 40 from one ISO freight container corner fitting 31 or 32 to another ISO freight container corner fitting 31 or 32. This enables connection of metal protrusion 112 to ISO freight container corner fitting 31 or 32. Certain embodiments use multiple footers 111 below a single end unit 200 or middle unit 300, or use a single footer 111 with multiple metal protrusions 112 beneath one or more end units 200 and/or middle units 300.

In certain embodiments, footer 110 has a rectangular or trapezoidal cross-section. In certain embodiments, metal protrusion 112 is a cone-shaped steel protrusion extending through an aperture in ISO freight container corner fitting 31 or 32. In other embodiments, metal protrusion 112 is a vertical twistlock 120 extending through an aperture in ISO freight container corner fitting 31 or 32.

In system 100, a user may connect a first end unit 200 to a second end unit 200 or a middle unit 300 by a plurality of horizontal twistlocks 125, such as a double-sided twistlock. Horizontal twistlocks 125 extend between ISO right freight container corner fittings 31 and ISO left freight container corner fittings 32 to horizontally connect an end unit 200 to another end unit 200, an end unit 200 to a middle unit 300, or a middle unit 300 to another middle unit 300. Horizontal twistlocks 125 have the same configuration as vertical twistlocks 120, but are oriented along a horizontal axis instead of a vertical axis.

In system 100, a user may stack an end unit 200 or a middle unit 300 onto another end unit 200 or another middle unit 300 by a plurality of vertical twistlocks 120, such as a double-sided twistlock. Vertical twistlocks 120 extend between ISO right freight container corner fittings 31 or ISO left freight container corner fittings 32 to vertically connect an end unit 200 or a middle unit 300 onto another end unit 200 or another middle unit 300.

Figure 70B:
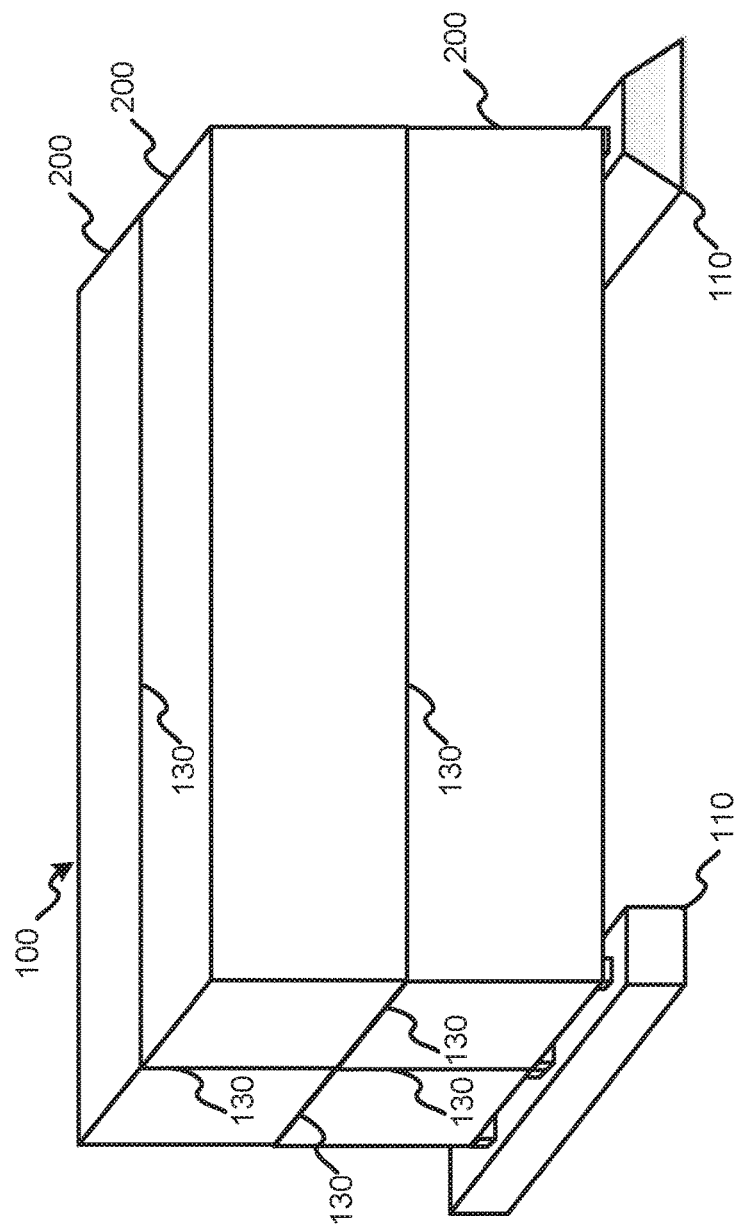
Figure 71:
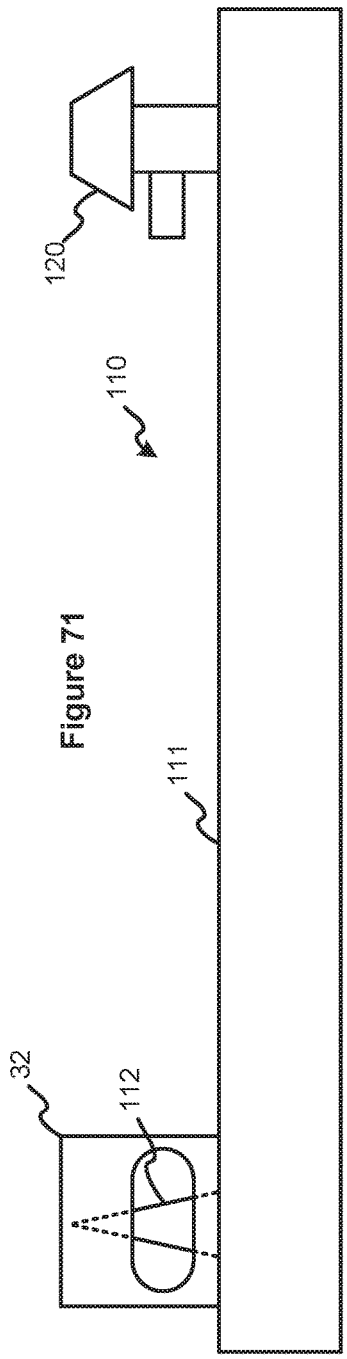
Figure 72:
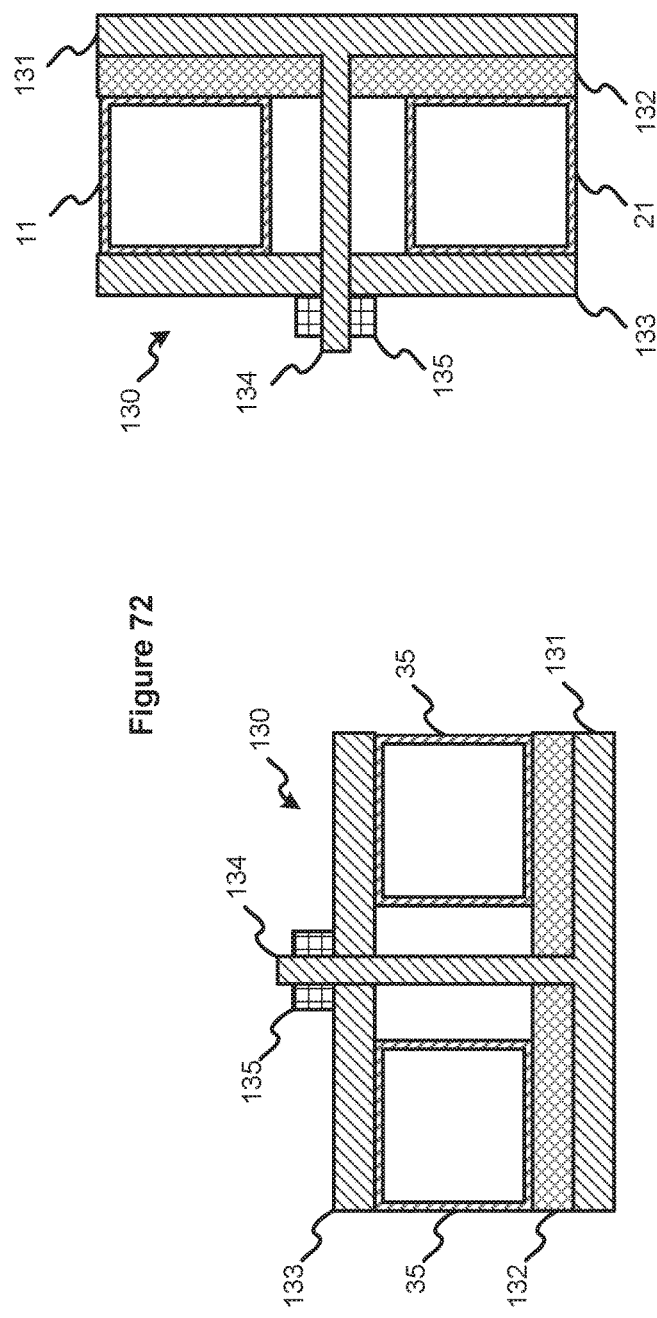

Obviously, systems 100 with two end units 200 connect the end units 200 at their respective sides opposite each end unit's 200 sidewall assembly 60. Systems 100 with two end units 200 and one or more middle units 300 connect the end units 200 to middle unit(s) 300 at their respective sides opposite each end unit's 200 side wall 22. To avoid a weak point at the join, and to prevent precipitation from leaking into end units 200 or middle units 300, a ballistic seal 130 extends along the seams between end units 200 and middle units 300. Such a ballistic seal 130 also protects the joins between stacked end units 200 and middle units 300, as can be seen in FIG. 70b.

Ballistic seal 130 includes a first layer 131 of metal, a second layer 132 of waterproof polymer, and a third layer 133 of metal. In the exemplary embodiment, the metal is steel and the waterproof polymer is neoprene. Corner columns 35, top main girders 22, middle top main girders 81, floor girders 11, bottom frames 34, top frames 36, bottom frame end 41, and/or top frame ends 42 of adjoining end units 200 and/or middle units 300 are located between second layer 132 and third layer 133. A plurality of threaded rods 134 extends from first layer 131, passes through second layer 132, and protrudes through third layer 133. A plurality of fasteners 135, such as nuts or clamps, prevent threaded rods 134 from retracting from third layer 133, keeping corner columns 35, top main girders 22, middle top main girders 81, floor girders 11, bottom frames 34, top frames 36, bottom frame end 41, and/or top frame ends 42 secured between second layer 132 and third layer 133.

FIGS. 73a-73c illustrate a flowchart of an exemplary method 400 for making end unit 200 for modular anti-ballistic shelter system 100.

In step 402, method 400 removably connects 4 ISO right freight container corner fittings 31 to a welding scaffold.

In step 404, method 400 removably connects 4 ISO left freight container corner fittings 32 to the welding scaffold. Each ISO left freight container corner fitting 32 is located directly opposite a corresponding ISO right freight container corner fitting 31.

In step 406, method 400 welds a corner column 35 between each pair of ISO right freight container corner fittings 31 and each pair of ISO left freight container corner fittings 32.

In step 408, method 400 welds bottom frame 34 between an ISO left freight container corner fitting 32 and a corresponding ISO right freight container corner fitting 31, and welds bottom frame end 41 between another ISO left freight container corner fitting 32 and another corresponding ISO right freight container corner fitting 31. Bottom frame end 41 is parallel to bottom frame for middle door 34.

In step 410, method 400 welds one floor girder 11 between an ISO left freight container corner fitting 32 and a corresponding ISO right freight container corner fitting 31, and welds another floor girder 11 between another ISO left freight container corner fitting 32 and another corresponding ISO right freight container corner fitting 31. Floor girders 11 are parallel to each other, and perpendicular to bottom frames 34 and 41.

In step 412, method 400 welds floor 14 to floor girders 11 and bottom frames 34 and 41.

In step 414, method 400 inserts wall studs 37 into stud apertures 15 in one floor girder 11 and bottom frames 34 and 41.

In step 416, method 400 welds wall studs 37 to one floor girder 11 and bottom frames 34 and 41.

In optional step 418, method 400 inserts bottom jack studs 43 into stud apertures 15 in one floor girder 11 and bottom frame end 41.

In optional step 420, method 400 welds bottom jack studs 43 to one floor girder 11 and bottom frame end 41.

In step 422, method 400 inserts the wall studs 37 of step 414 into stud apertures 15 in top girder 21, top frame 36, and top frame end 42.

In step 424, method 400 welds wall studs 37 to top girder 21, top frame 36, and top frame end 42.

In optional step 426, method 400 inserts top jack studs 44 into stud apertures 15 in top girder 21 and top frame end 42.

In optional step 428, method 400 welds top jack studs 44 to top girder 21 and top frame end 42.

In step 430, method 400 welds top frame 36 between an ISO left freight container corner fitting 32 and a corresponding ISO right freight container corner fitting 31, and welds top frame end 42 between another ISO left freight container corner fitting 32 and another corresponding ISO right freight container corner fitting 31. Top frame end 42 is parallel to top frame for middle door 36.

In step 432, method 400 welds top girder 21 between an ISO left freight container corner fitting 32 and a corresponding ISO right freight container corner fitting 31, and welds top main girder 22 between another ISO left freight container corner fitting 32 and another corresponding ISO right freight container corner fitting 31. Top and top main girders 21 and 22 are parallel to each other, and perpendicular to top frames 36 and 42.

In step 434, method 400 welds roof 23 and interior roof 24 to the floor/roof support beams 12, channeled floor/roof support beams 13, top girder 21, and top main girder 22 of top assembly 20.

In step 436, method 400 welds exterior plate 38 and interior plate 39 to bottom frame 34, corner columns 35, and top frame for middle door 36 of end wall assembly with door 30.

In step 438, method 400 welds exterior end wall 45 and interior end wall 46 to bottom frame end 41, corner columns 35, and top frame end 42 of end wall assembly with window 40.

In step 440, method 200 welds an exterior sidewall 62 and an interior sidewall 61 to a floor girder 11, a top girder 21, and two corner columns 35.

In optional step 442, method 400 welds window frame assembly 50 into endwall assembly 40 or sidewall assembly 60.

In optional step 444, method 400 welds door frame assembly 33 into endwall assembly 30 or sidewall assembly 60.

When fabricated, each end unit 200 and each middle unit 300 conform to ISO standards for shipping containers, having outer dimensions of 40 feet long, 8 feet wide, and 8.5 feet tall, and a maximum weight of 66,139 lbs. When end units 200 and optional middle units 300 are assembled into modular anti-ballistic shelter system 100, system 100 meets the U.S. Department of State Certification Standard for Forced Entry and Ballistic Resistance of Structural Systems, SDSTD01.01.

It will be understood that many additional changes in the details, materials, procedures and arrangement of parts, which have been herein described and illustrated to explain the nature of the invention, may be made by those skilled in the art within the principle and scope of the invention as expressed in the appended claims. Moreover, the term "approximate" as used herein may be applied to modify any quantitative representation that could permissibly vary without resulting in a change in the basic function to which it is related.

It should be further understood that the drawings are not necessarily to scale; instead, emphasis has been placed upon illustrating the principles of the invention.

What is claimed is:

1. An end unit for a modular anti-ballistic shelter system, wherein said end unit comprises:
  a base assembly comprising:
    a plurality of channeled floor/roof support beams extending between a plurality of floor girders, said plurality of channeled floor/roof support beams connected to a plurality of floor/roof support beams,
    a floor connected to said plurality of floor girders,
    wherein one of said plurality of floor girders has a plurality of stud apertures spaced 16 inches apart at center,
    wherein each of said plurality of channeled floor/roof support beams has a length of 9.59375 feet, a width of 3 inches, a height of 2 inches, and a weight of 7.1 lbs. per foot of length,
    wherein each of said plurality of floor girders has a length of 39.125 feet and a hollow structural cross-section of 10 by 5 by ⅜ inches
    wherein each of said plurality of floor/roof support beams has a length of 7.125 feet and a hollow structural cross-section of 3 by 3 by 5/16 inches,
    wherein said floor has dimensions of 39.5 feet by 7.395833 feet;
  a top assembly comprising:
    a plurality of channeled floor/roof support beams extending between a top girder and a top main girder, said plurality of channeled floor/roof support beams connected to a plurality of floor/roof support beams,
    a roof connected to and located above said top girder and said top main girder,
    an interior roof connected to and located below said top girder and said top main girder,
    wherein said top girder has a plurality of stud apertures spaced 16 inches apart at center,
    wherein said top girder has a length of 39.833 feet and a hollow structural cross-section of 5 by 3 by ½ inches,
    wherein said top main girder has a length of 39.125 feet and a hollow structural cross-section of 9 by 5 by ¼ inches,
    wherein said roof has dimensions of 39.95833 feet by 7.95833 feet,
    wherein said interior roof has dimensions of 39.20833 feet by 7.125 feet;
  a first end wall assembly comprising:
    two ISO right freight container corner fittings and two ISO left freight container corner fittings, a bottom frame and a top frame connecting said two ISO right freight container corner fittings to said two ISO left freight container corner fittings,
    a plurality of corner columns connecting said two ISO right freight container corner fittings and connecting said two ISO left freight container corner fittings,
    an exterior plate connected to said bottom frame, said top frame, and said plurality of corner columns,
    an interior plate connected to said bottom frame, said top frame, and said plurality of corner columns,
    wherein said bottom frame and said top frame have a plurality of stud apertures, wherein a plurality of wall studs extend through said plurality of stud apertures into said bottom frame and said top frame,
    wherein said bottom frame has a length of 6.9270833 feet and a hollow structural cross-section of 10 by 5 by ⅜ inches,
    wherein said top frame has a length of 6.9270833 feet and a hollow structural cross-section of 5 by 3 by ⅜ inches,
    wherein each of said plurality of corner columns has a height of 9.166 feet, and a hollow structural cross-section of 5 by 5 by ⅜ inches,
    wherein each of said plurality of wall studs has a height of 9.166 feet and a hollow structural cross-section of 3 by 2 by ¼ inches,
    wherein said exterior plate has dimensions of 7.125 feet by 8.270833 feet, wherein said interior plate has dimensions of 7.125 feet by 8.270833 feet;
  a second end wall assembly comprising:
    two ISO right freight container corner fittings and two ISO left freight container corner fittings, a bottom frame end and a top frame end connecting said two ISO right freight container corner fittings to said two ISO left freight container corner fittings,
    a plurality of corner columns connecting said two ISO right freight container corner fittings and connecting said two ISO left freight container corner fittings,
    an exterior end wall connected to said bottom frame end, said top frame end, and said plurality of corner columns,
    an interior end wall connected to said bottom frame end, said top frame end, and said plurality of corner columns,
    wherein said bottom frame end and said top frame end have a plurality of stud apertures, wherein a plurality of wall studs extend through said plurality of stud apertures into said bottom frame end and said top frame end, wherein said bottom frame end has a length of 7.125 feet and a hollow structural cross-section of 10 by 5 by ⅜ inches, wherein said top frame end has a length of 6.9270833 feet and a hollow structural cross-section of 5 by 3 by ½ inches, wherein said exterior end wall has dimensions of 7.125 feet by 8.270833 feet, wherein said interior end wall has dimensions of 7.125 feet by 8.25 feet; and a sidewall assembly comprising:
an exterior sidewall connected to one of said plurality of floor girders and said top girder,
an interior sidewall connected to one of said plurality of floor girders and said top girder,
wherein a plurality of wall studs extend into said top girder and one of said plurality of floor girders through said plurality of stud apertures in said top girder and one of said plurality of floor girders,
wherein said exterior sidewall has dimensions of 39.125 feet by 8.25 feet,
wherein said interior sidewall has dimensions of 39.125 feet by 8.25 feet.

2. The end unit of claim 1, wherein a center of each stud aperture is located 12.25 inches to 16 inches from a center of another stud aperture in said top end beam or said bottom end beam.

3. The end unit of claim 1, wherein at least one pair of said exterior end wall and said interior end wall or said interior sidewall and said exterior sidewall includes at least one window frame assembly.

4. The end unit of claim 1, wherein said exterior end plate and said interior end include a door frame assembly.

5. The end unit of claim 1, wherein said exterior plate, said interior plate, said exterior end wall, said interior end wall, said interior sidewall, and said exterior sidewall are 0.0625 inches to 0.5 inches thick.

6. The end unit of claim 1, wherein said exterior plate, said interior plate, said exterior end wall, said interior end wall, said interior sidewall, and said exterior sidewall are 0.5 inches to 1 inch thick.

7. A modular anti-ballistic shelter system, comprised of:
a first end unit and a second end unit, wherein each end unit comprises:
a base assembly comprising:
a plurality of channeled floor/roof support beams extending between a plurality of floor girders, said plurality of channeled floor/roof support beams connected to a plurality of floor/roof support beams,
a floor connected to said plurality of floor girders,
wherein one of said plurality of floor girders has a plurality of stud apertures spaced 16 inches apart at center,
wherein each of said plurality of channeled floor/roof support beams has a length of 9.59375 feet, a width of 3 inches, a height of 2 inches, and a weight of 7.1 lbs. per foot of length,
wherein each of said plurality of floor girders has a length of 39.125 feet and a hollow structural cross-section of 10 by 5 by ⅜ inches
wherein each of said plurality of floor/roof support beams has a length of 7.125 feet and a hollow structural cross-section of 3 by 3 by 5/16 inches,
wherein said floor has dimensions of 39.5 feet by 7,395833 feet;

a top assembly comprising:
a plurality of channeled floor/roof support beams extending between a top girder and a top main girder, said plurality of channeled floor/roof support beams connected to a plurality of floor/roof support beams,
a roof connected to and located above said top girder and said top main girder,
an interior roof connected to and located below said top girder and said top main girder,
wherein said top girder has a plurality of stud apertures spaced 16 inches apart at center,
wherein said top girder has a length of 39.833 feet and a hollow structural cross-section of 5 by 3 by ½ inches,
wherein said top main girder has a length of 39.125 feet and a hollow structural cross-section of 9 by 5 by ¼ inches,
wherein said roof has dimensions of 39.95833 feet by 7.95833 feet, wherein said interior roof has dimensions of 39.20833 feet by 7.125 feet;

a first end wall assembly comprising:
two ISO right freight container corner fittings and two ISO left freight container corner fittings, a bottom frame and a top frame connecting said two ISO right freight container corner fittings to said two ISO left freight container corner fittings,
a plurality of corner columns connecting said two ISO right freight container corner fittings and connecting said two ISO left freight container corner fittings,
an exterior plate connected to said bottom frame, said top frame, and said plurality of corner columns,
an interior plate connected to said bottom frame, said top frame, and said plurality of corner columns,
wherein said bottom frame and said top frame have a plurality of stud apertures, wherein a plurality of wall studs extend through said plurality of stud apertures into said bottom frame and said top frame,
wherein said bottom frame has a length of 6.9270833 feet and a hollow structural cross-section of 10 by 5 by ⅜ inches,
wherein said top frame has a length of 6.9270833 feet and a hollow structural cross-section of 5 by 3 by ⅜ inches,
wherein each of said plurality of corner columns has a height of 9.166 feet, and a hollow structural cross-section of 5 by 5 by ⅜ inches,
wherein each of said plurality of wall studs has a height of 9.166 feet and a hollow structural cross-section of 3 by 2 by ¼ inches,
wherein said exterior plate has dimensions of 7.125 feet by 8.270833 feet,
wherein said interior plate has dimensions of 7.125 feet by 8.270833 feet;

a second end wall assembly comprising:
two ISO right freight container corner fittings and two ISO left freight container corner fittings, a bottom frame end and a top frame end connecting said two ISO right freight container corner fittings to said two ISO left freight container corner fittings,
a plurality of corner columns connecting said two ISO right freight container corner fittings and connecting said two ISO left freight container corner fittings,
an exterior end wall connected to said bottom frame end, said top frame end, and said plurality of corner columns, an interior end wall connected to said bottom frame end, said top frame end, and said plurality of corner columns,
wherein said bottom frame end and said top frame end have a plurality of stud apertures, wherein a plurality of wall studs extend through said plurality of stud apertures into said bottom frame end and said top frame end,
wherein said bottom frame end has a length of 7.125 feet and a hollow structural cross-section of 10 by 5 by ⅜ inches,
wherein said top frame end has a length of 6.9270833 feet and a hollow structural cross-section of 5 by 3 by ½ inches,
wherein said exterior end wall has dimensions of 7.125 feet by 8.270833 feet,
wherein said interior end wall has dimensions of 7.125 feet by 8.25 feet; and
a sidewall assembly comprising:
an exterior sidewall connected to one of said plurality of floor girders and said top girder,
an interior sidewall connected to one of said plurality of floor girders and said top girder,
wherein a plurality of wall studs extend into said top girder and one of said plurality of floor girders through said plurality of stud apertures in said top girder and one of said plurality of floor girders,
wherein said exterior sidewall has dimensions of 39.125 feet by 8.25 feet,
wherein said interior sidewall has dimensions of 39.125 feet by 8.25 feet.
wherein said first end unit is connected to said second end unit by a plurality of horizontal twistlocks extending from at least two of said plurality of ISO right freight container corner fittings of said first end unit to at least two of said plurality of ISO left freight container corner fittings of said second end unit.

8. The system of claim 7, further including a ballistic seal extending between said first end unit and second end unit, said ballistic seal comprising a first layer of steel, a second layer of waterproof polymer, and a third layer of steel, wherein at least one of said corner columns of said first end unit and at least one of said corner columns of said second end unit are located between said second layer and said third layer.

9. The system of claim 8, wherein a plurality of threaded rods extends from said first layer, through said second layer, and protrudes through said third layer, wherein a plurality of fasteners prevent said plurality of threaded rods from retracting from said third layer.

10. The system of claim 7, further including a third end unit located atop said first end unit and a fourth end unit located atop said second end unit.

11. The system of claim 7, further including at least one middle unit Inflated between said first end unit and said second end unit, wherein said middle unit comprises:
a middle base assembly comprising:
a plurality of channeled floor/roof support beams extending between a plurality of floor girders, said plurality of channeled floor/roof support beams connected to a plurality of middle floor/roof support beams,
a middle floor connected to said plurality of floor girders,
wherein each of said plurality of middle floor/roof support beams has a length of 7.11979166 feet and a hollow structural cross-section of 3 by 3 by 5⁄16 inches,
wherein said middle floor has dimensions of 39.20833 feet by 7.953125 feet;
a middle top assembly comprising:
a plurality of channeled floor/roof support beams extending between a plurality of middle top main girders, said plurality of channeled floor/roof support beams connected to a plurality of middle floor/roof support beams,
a middle roof connected to and located above said plurality of middle top main girders,
a middle interior roof connected to and located below said plurality of middle top main girders,
wherein each of said plurality of middle top main girders has a length of 39.125 feet and a hollow structural cross-section of 9 by 5 by ¼ inches,
wherein said middle roof has dimensions of 39.95833 feet by 7.953125 feet,
wherein said middle interior roof has dimensions of 39.20833 feet by 7.953125 feet; and
a plurality of middle end wall assemblies, wherein each middle end wall assembly comprises:
two ISO right freight container corner fittings and two ISO left freight container corner fittings, a bottom end beam and a top end beam connecting said two ISO right freight container corner fittings to said two ISO left freight container corner fittings,
a plurality of middle corner columns connecting said two ISO right freight container corner fittings and connecting said two ISO left freight container corner fittings,
an exterior end plate connected to said bottom end beam, said top end beam, and said plurality of middle corner columns,
an interior end plate connected to said bottom end beam, said top end beam, and said plurality of middle corner columns,
wherein said bottom end beam and said top end beam have a plurality of stud apertures, wherein a plurality of wall studs extend through said plurality of stud apertures into said bottom end beam and said top end beam,
wherein said bottom end beam has a length of 7.125 feet and a hollow structural cross-section of 10 by 5 by ⅜ inches,
wherein said top end beam has a length of 6.9375 feet and a hollow structural cross-section of 5 by 3 by ½ inches,
wherein each of said plurality of middle corner columns has a height of 8.72395833 feet and a hollow structural cross-section of 5 by 5 by ⅜ inches,
wherein said exterior end plate has dimensions of 8.27604166 feet by 7.125 feet,
wherein said interior end plate has dimensions of 8.27604166 feet by 7.125 feet.

12. The system of claim 11, further including a ballistic seal extending between said first end unit and said at least one middle unit, said ballistic seal comprising a first layer of steel, a second layer of waterproof polymer, and a third layer of steel, wherein at least one of said corner columns of said first end unit and at least one of said middle corner columns of at least one middle unit are located between said second layer and said third layer.

13. The system of claim 11, further including a third end unit located atop said first end unit, a fourth end unit located atop said second end unit, and at least one additional middle unit located atop said at least one middle unit.

14. The system of claim 7, further comprising at least one footer embedded in the ground below said first end unit or said second end unit, wherein said footer comprises a concrete platform having at least one metal protrusion extending therefrom.

15. The system of claim 14, wherein said at least one footer has a trapezoidal cross-section.

16. The system of claim 14, wherein said at least one footer extends from one of said ISO right freight container corner fittings to one of said ISO left freight container corner fittings.

17. The system of claim 14, wherein said at least one metal protrusion is a vertical twistlock removably connected to one of said ISO right freight container corner fittings or one of said ISO left freight container corner fittings.

18. The system of claim 14, wherein said at least one footer comprises a first footer and a second footer, wherein said first footer extends below said first end wall assembly and said second footer extends below said second end wall assembly.

19. The system of claim 14, wherein said at least one metal protrusion is a cone-shaped steel protrusion extending through an aperture in one of said ISO right freight container corner fittings or one of said ISO left freight container corner fittings.

* * * * *